(12) United States Patent
Ball

(10) Patent No.: US 7,184,088 B1
(45) Date of Patent: Feb. 27, 2007

(54) APPARATUS AND METHOD FOR OBTAINING 3D IMAGES

(75) Inventor: Stephen L Ball, York (GB)

(73) Assignee: Measurement Devices Limited, Aberdeen (GB)

( * ) Notice: Subject to any disclaimer, the term of this patent is extended or adjusted under 35 U.S.C. 154(b) by 0 days.

(21) Appl. No.: 09/830,806

(22) PCT Filed: Oct. 28, 1999

(86) PCT No.: PCT/GB99/03518

§ 371 (c)(1),
(2), (4) Date: Jul. 30, 2001

(87) PCT Pub. No.: WO00/25089

PCT Pub. Date: May 4, 2000

(30) Foreign Application Priority Data

Oct. 28, 1998 (GB) ................................. 9823463.6
Aug. 31, 1999 (GB) ................................. 9920460.4

(51) Int. Cl.
*H04N 5/232* (2006.01)

(52) U.S. Cl. ...................... 348/348; 348/373; 382/154

(58) Field of Classification Search ..................... None
See application file for complete search history.

(56) References Cited

U.S. PATENT DOCUMENTS

| | | | | |
|---|---|---|---|---|
| 5,175,616 | A * | 12/1992 | Milgram et al. | 348/47 |
| 5,337,149 | A * | 8/1994 | Kozah et al. | 356/601 |
| 5,446,465 | A * | 8/1995 | Diefes et al. | 342/357.08 |
| 5,694,483 | A * | 12/1997 | Onoguchi | 382/154 |
| 6,330,523 | B1 * | 12/2001 | Kacyra et al. | 702/159 |
| 6,839,081 | B1 * | 1/2005 | Iijima et al. | 348/46 |
| 2005/0275830 | A1 * | 12/2005 | Ohtomo et al. | 356/141.1 |

* cited by examiner

*Primary Examiner*—Ngoc Yen Vu
*Assistant Examiner*—Hung Lam
(74) *Attorney, Agent, or Firm*—Howrey LLP

(57) ABSTRACT

An apparatus and method particularly, but not exclusively, suited for use in survey applications are disclosed which allow a three dimensional image of a target or target area to be created. An imaging device is used to capture a two dimensional image of the target or target area. A range finder is then used to measure the range to a plurality of points within the target area to allow a three dimensional image to be recreated.

7 Claims, 17 Drawing Sheets

APPARATUS AND METHOD FOR OBTAINING 3D IMAGES

This application is a section 371 national stage filing of PCT/GB99/03518, filed Oct. 28, 1999 (published in English on May 4, 2000 as WO 00/25089) and claiming priority to British patent application No. 9823463.6, filed Oct. 28, 1998; and British patent application No. 9920460.4, filed Aug. 31, 1999.

The present invention relates to apparatus and a method for creating a three dimensional image, and particularly, but not exclusively, to apparatus and a method for creating a three dimensional image for use in surveying.

Conventional survey equipment typically measures the distance, bearing and inclination angle to a target (such as a tree, electricity pylon or the like) or a target area, with reference to the position of a user. While this information is useful, it would be advantageous to create a three-dimensional (3D) image of the target and/or target area.

In addition, conventional sighting devices which are used to select a target to be surveyed often result in false surveys being made as the target is often not correctly identified.

There are a number of conventional techniques which are capable of generating a three-dimensional (3D) image from photographs. One such technique is stereophotography (SP). SP uses two simultaneous images taken by two cameras positioned at fixed points. The two fixed points are precisely spaced apart along a baseline distance.

However, this conventional technique has a number of associated disadvantages. Firstly, the pictures are not direct to digital, which creates difficulties in manipulating the images after they have been taken. The images typically require to be ortho-corrected and the method itself is generally slow and can be expensive due to the precision cameras required.

According to a first aspect of the present invention there is provided an apparatus comprising an imaging device, a range finder, and a processor capable of receiving and processing image and range signals to construct a three-dimensional image from said signals.

According to a second aspect of the present invention there is provided a method of generating a three-dimensional image of a target area, the method comprising the steps of providing an imaging device, providing a range finder, operating the imaging device to provide an image of the target area, and subsequently measuring the distance to each of a plurality of points by scanning the range finder at preset intervals relating to the points.

The imaging device is preferably a camera, typically a digital video camera, and preferably a charge-coupled device (CCD) video camera. Alternatively, the camera may comprise a digital camera. The camera is preferably capable of zoom functions. This allows targets which may be some distance from the apparatus to be viewed more accurately and/or remotely.

The apparatus typically includes a display device to allow a user to view a target area using the imaging device. The display device typically comprises a VGA eyepiece monitor, such as a liquid-crystal display (LCD) or flat panel display. The display device may alternatively comprise a VGA monitor. This offers the advantage that an image of the target may be viewed by the user to ensure that the correct target has been selected. Also, the apparatus may be operated remotely using the camera to view the target area.

The apparatus preferably includes a pan and tilt unit for panning and tilting of the range finder and/or camera. The pan and tilt unit typically comprises a first motor for panning of the range finder and/or camera, and a second motor for tilting of the range finder and/or camera. The pan and tilt unit typically includes first and second digital encoders for measuring the angles of pan and tilt respectively. The first and second motors are typically controlled by the processor. The outputs of the first and second encoders is typically fed to the processor. This provides a feedback loop wherein the motors are operated to pan and tilt the range finder and/or camera through the generated horizontal and vertical angles. The encoders may then be used to check the angles to ensure that the range finder and/or camera were panned and tilted through the correct angles.

The image is preferably digitised, wherein the image comprises a plurality of pixels. Optionally, the image may be a captured image. The target is typically selected by selecting a plurality of pixels around the target, using, for example, a mouse pointer. This produces x and y coordinates for the target pixels and defines a target area eg a building or a part thereof.

Typically, the range finder is preferably a laser range finder. Preferably, the laser range finder is bore-sighted with the camera. This, in conjunction with the eyepiece monitor used to identify the target area, offers the advantage that the user can be sure that the target area he has selected will be captured by the camera. In addition, any subsequent calculations made by the processor do not require an offset between the camera and the range finder to be considered.

Preferably, the apparatus includes a compass and an inclinometer and/or gyroscope. These allow the bearing and angle of inclination to the target to be measured. These are preferably digitised to provide data to the processor.

Optionally, the apparatus further includes a position fixing system for identifying the geographical position of the apparatus. The position fixing system is preferably a Global Positioning System (GPS) which typically includes a Differential Global Positioning System (DGPS). This provides the advantage that the approximate position of the user can be recorded (and thus the position of the target using the measurements from the range finder and compass, where used. Preferably, the GPS/DGPS facilitates the time of the survey to be recorded.

The apparatus is typically mounted on a mounting device. The mounting device typically comprises headgear which may be worn on the head of a user. The headgear typically comprises a hard-hat type helmet. Alternatively, the apparatus may be located within a housing. The housing is typically a hand-held device.

Optionally, the mounting device may be a tripod stand or a platform which forms part of an elevation system, wherein the apparatus is elevated to allow larger areas to be surveyed.

Optionally, the apparatus may be operated by remote control.

The compass is preferably a digital fluxgate compass.

The apparatus is typically controlled by an input device. The input device is typically used to activate the apparatus, and may be a keyboard, keypad, penpad or the like. Typically, the input device facilitates operation of a particular function of the apparatus. The input device is typically interfaced to the processor via a standard keyboard input.

The GPS/DGPS is preferably integrally moulded within the helmet.

The method typically includes the additional step of selecting the target area to be surveyed using the imaging device.

The method typically includes any one, some or all of the further steps of
obtaining a focal length of the camera;
obtaining a field of view of the camera;
calculating the principal distance of the camera;
obtaining the horizontal offset and vertical offset between an axis of the camera and an axis of the laser;
calculating the horizontal and vertical offsets in terms of pixels;
calculating the difference between the horizontal and vertical offsets in terms of pixel and the x and y coordinates of the target pixel; and
calculating the horizontal and vertical angles.

Optionally, the method typically includes one, some or all of the further steps of
instructing the pan and tilt unit to pan and tilt the range finder and/or camera through the vertical and horizontal angles;
measuring the horizontal and vertical angles using the encoders;
verifying that the angles through which the range finder and/or camera are moved is correct;
obtaining horizontal and/or vertical correction angles by subtracting the measured horizontal and vertical angles from the calculated horizontal and vertical angles;
adjusting the pan and tilt of the range finder and/or camera if necessary; and
activating the range finder to obtain the range to the target.

Preferably, the method includes the additional step of correlating the position of the pixels in the digital picture with the measured distance to each pixel. This generates a set of x, y and z co-ordinates for all of the pixel points which may be used to generate a three dimensional image of the target area.

Embodiments of the present invention shall now be described, by way of example only, with reference to the accompanying drawings in which:—

Figure 2:
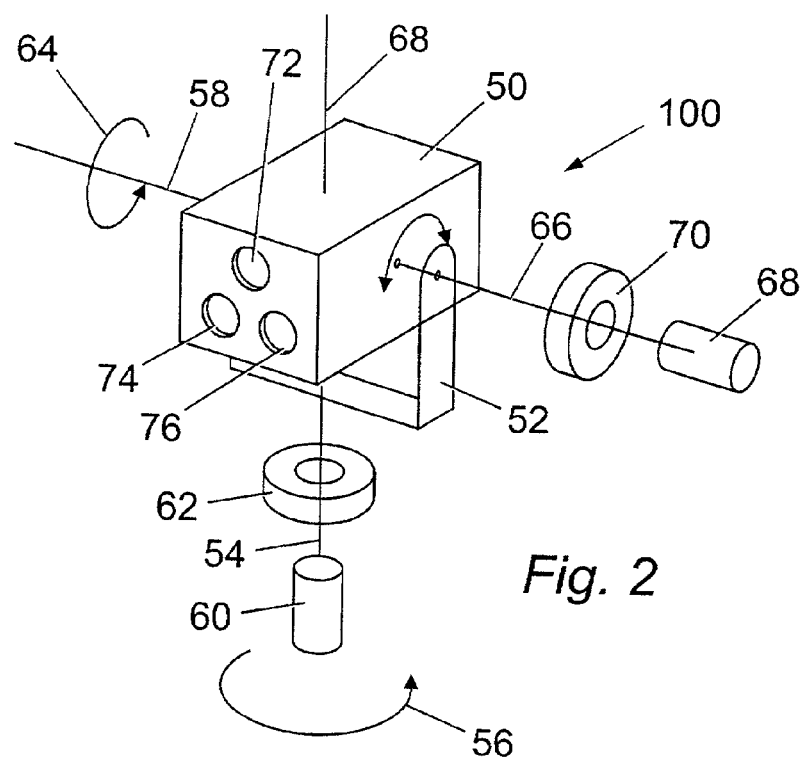
FIG. 2 shows schematically a first embodiment of an apparatus.
Figure 3:
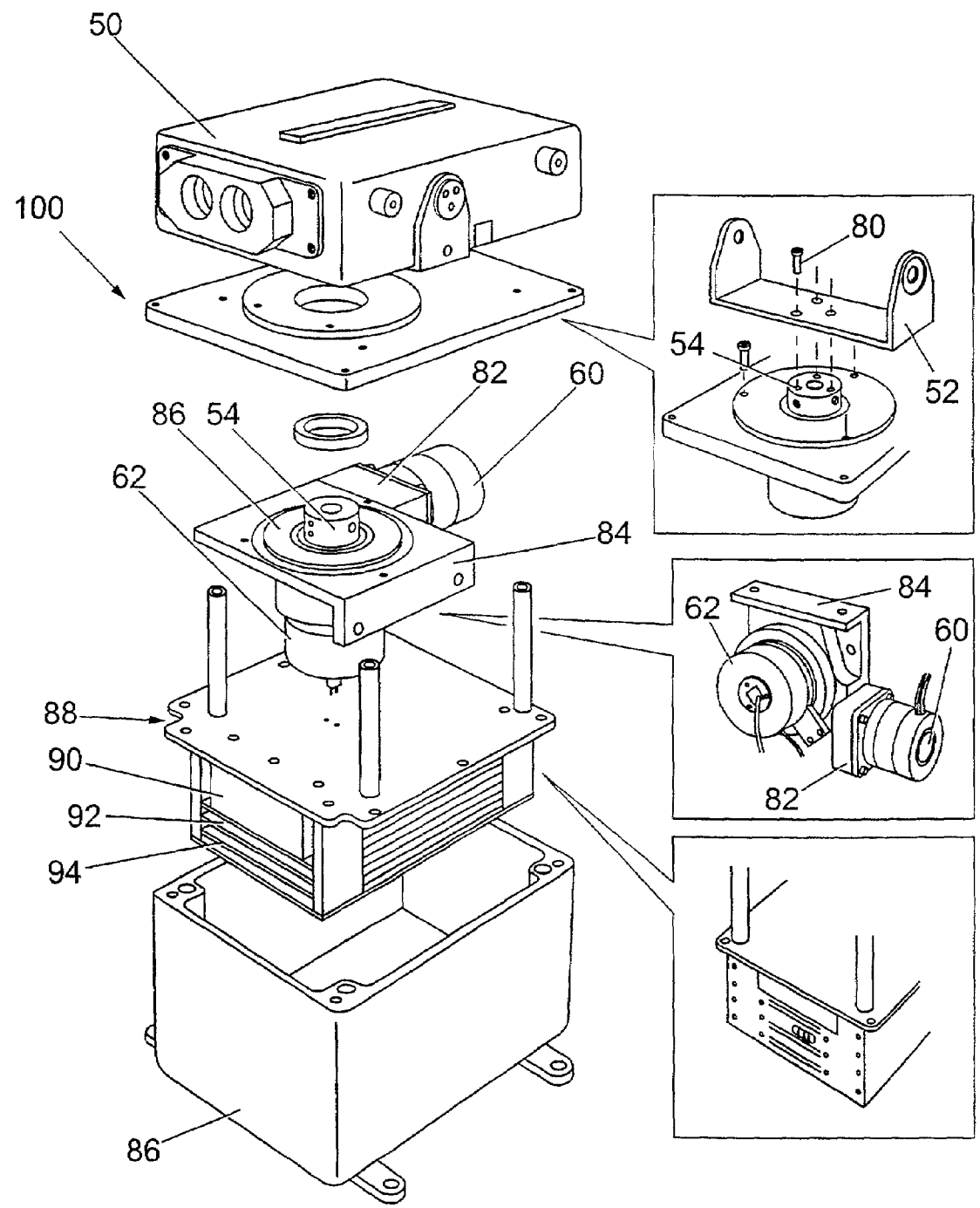
FIG. 3 shows an exploded view of the apparatus of FIG. 2 in more detail.
Figure 5:
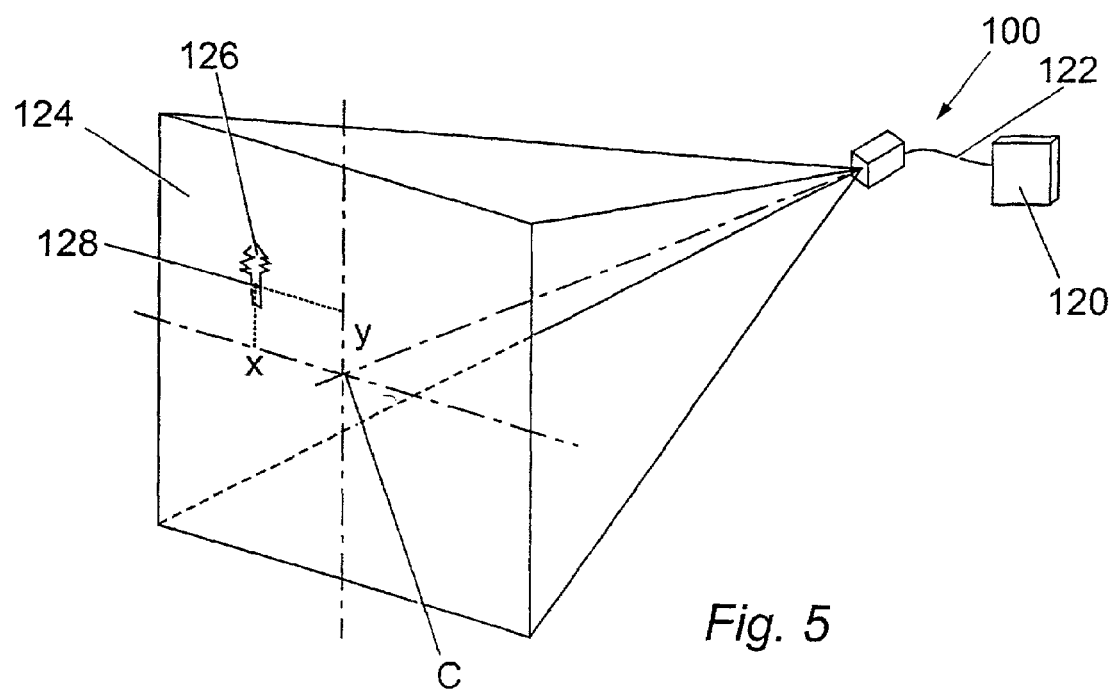
Figure 6:
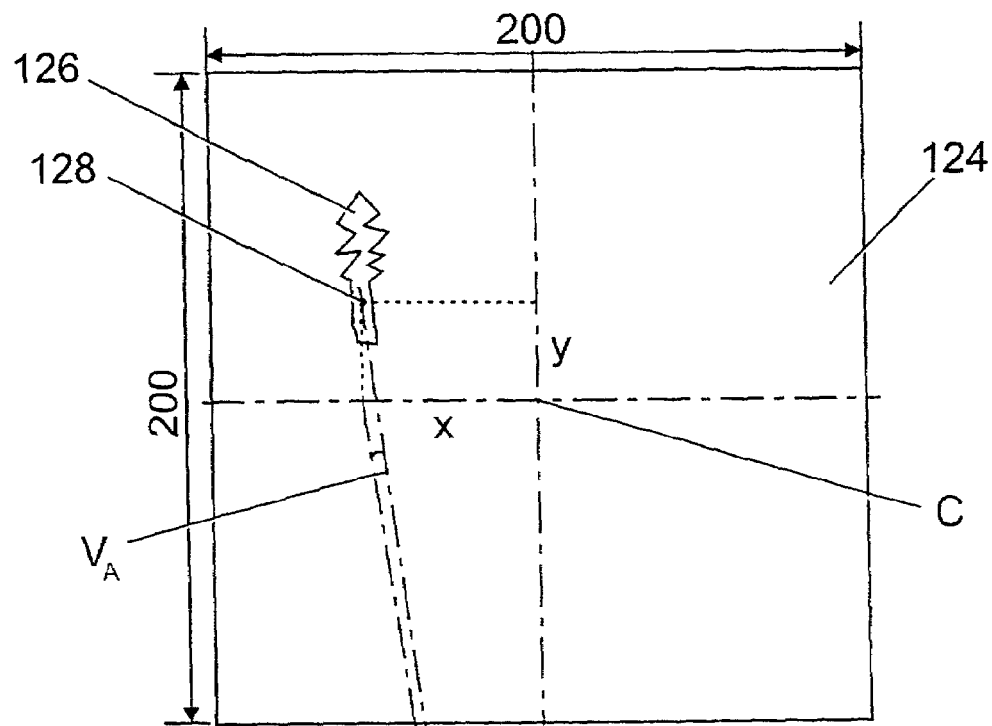
Figure 6:
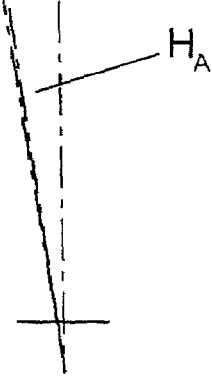
Figure 7:
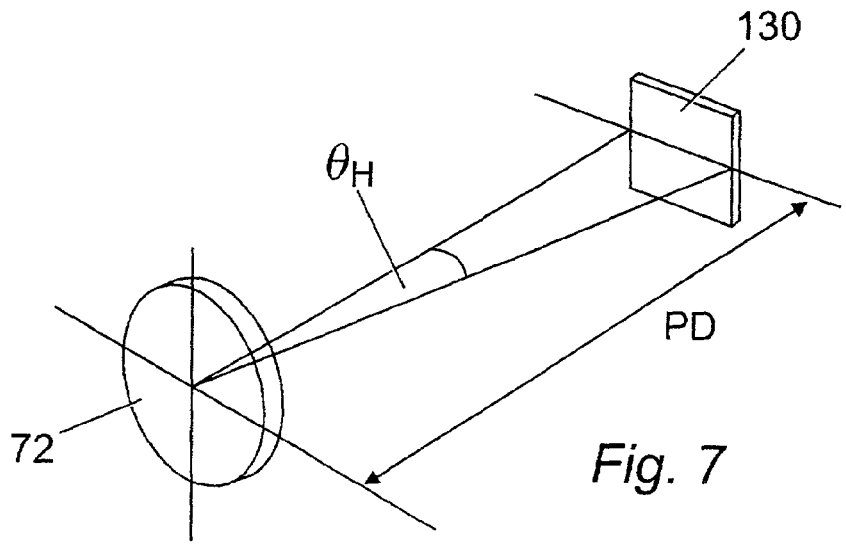
Figure 8:
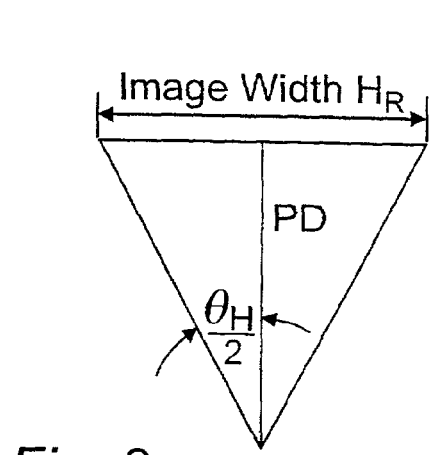
Figure 9:
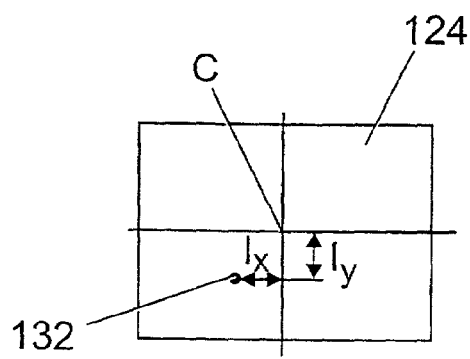
Figure 10:
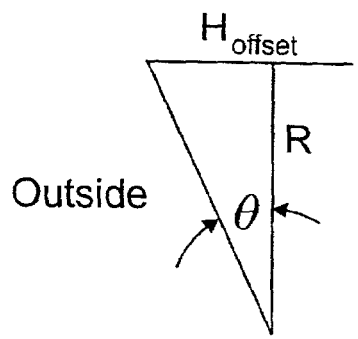
Figure 11:
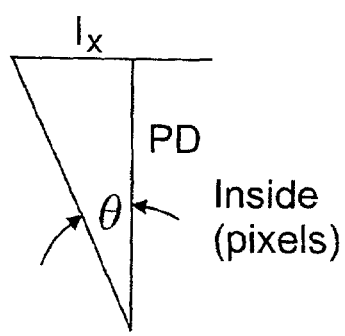
Figure 12:
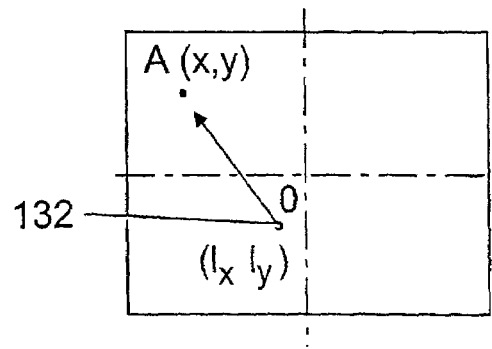
Figure 13:
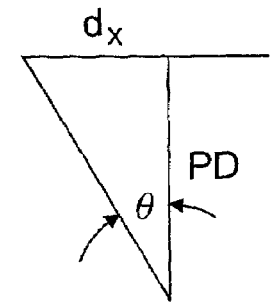
Figure 14:
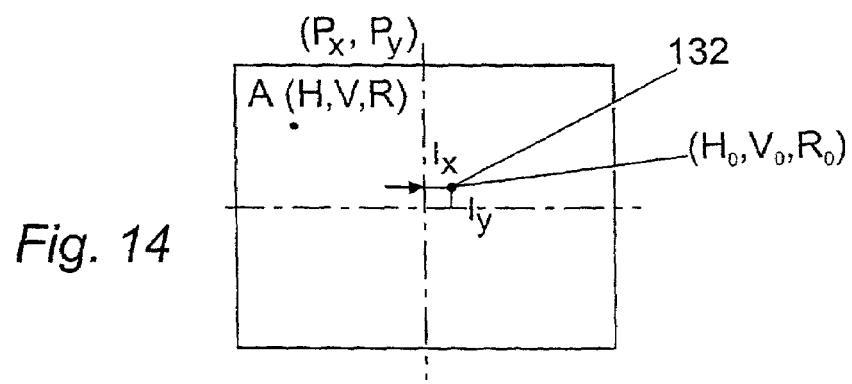
Figure 15:
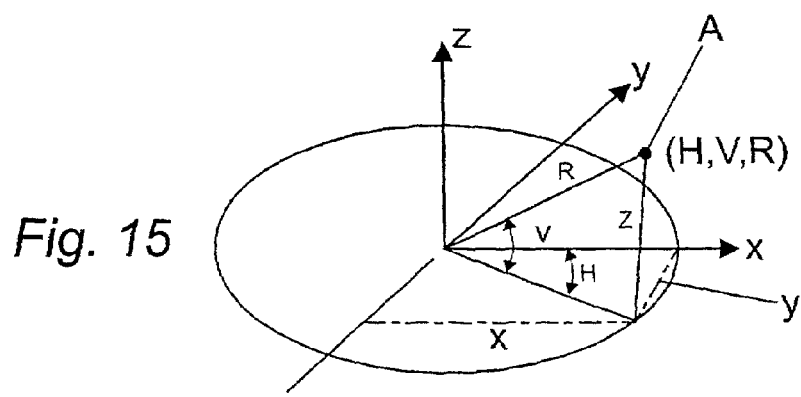
Figure 16:
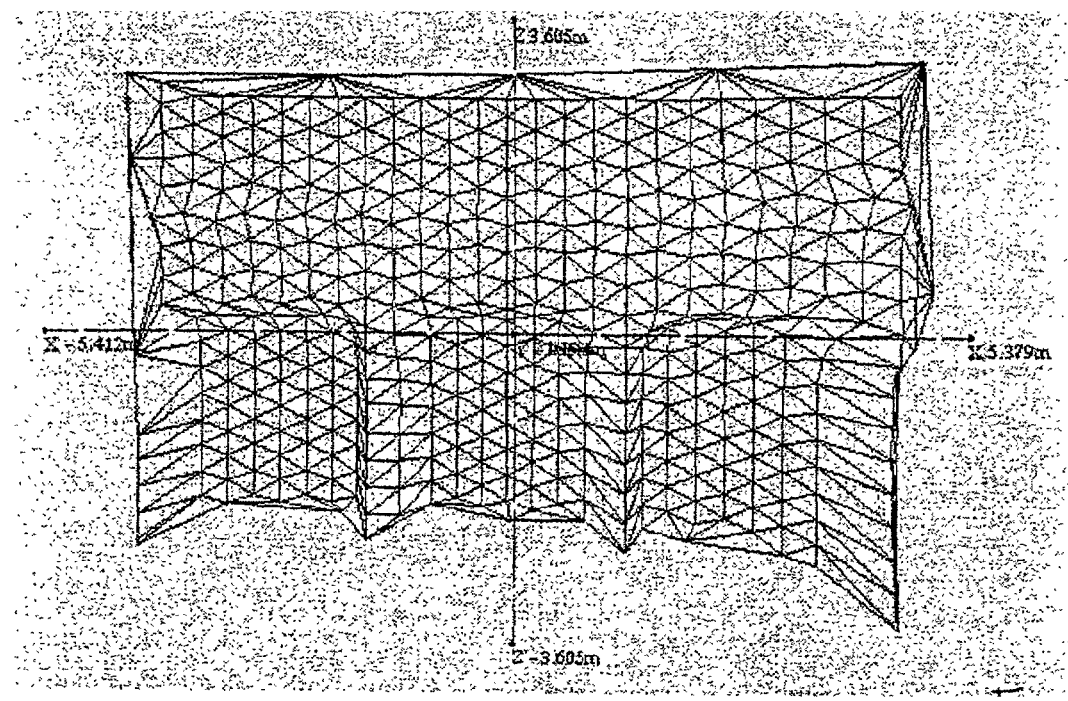
Figure 17:
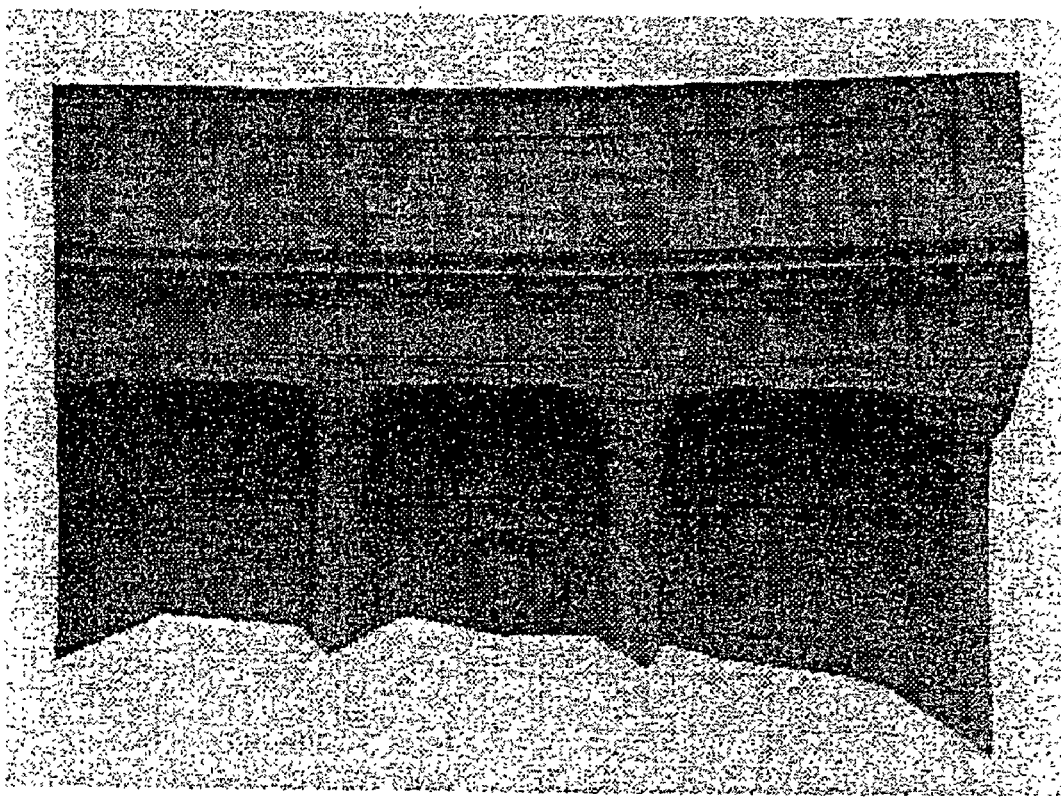
Figure 18:
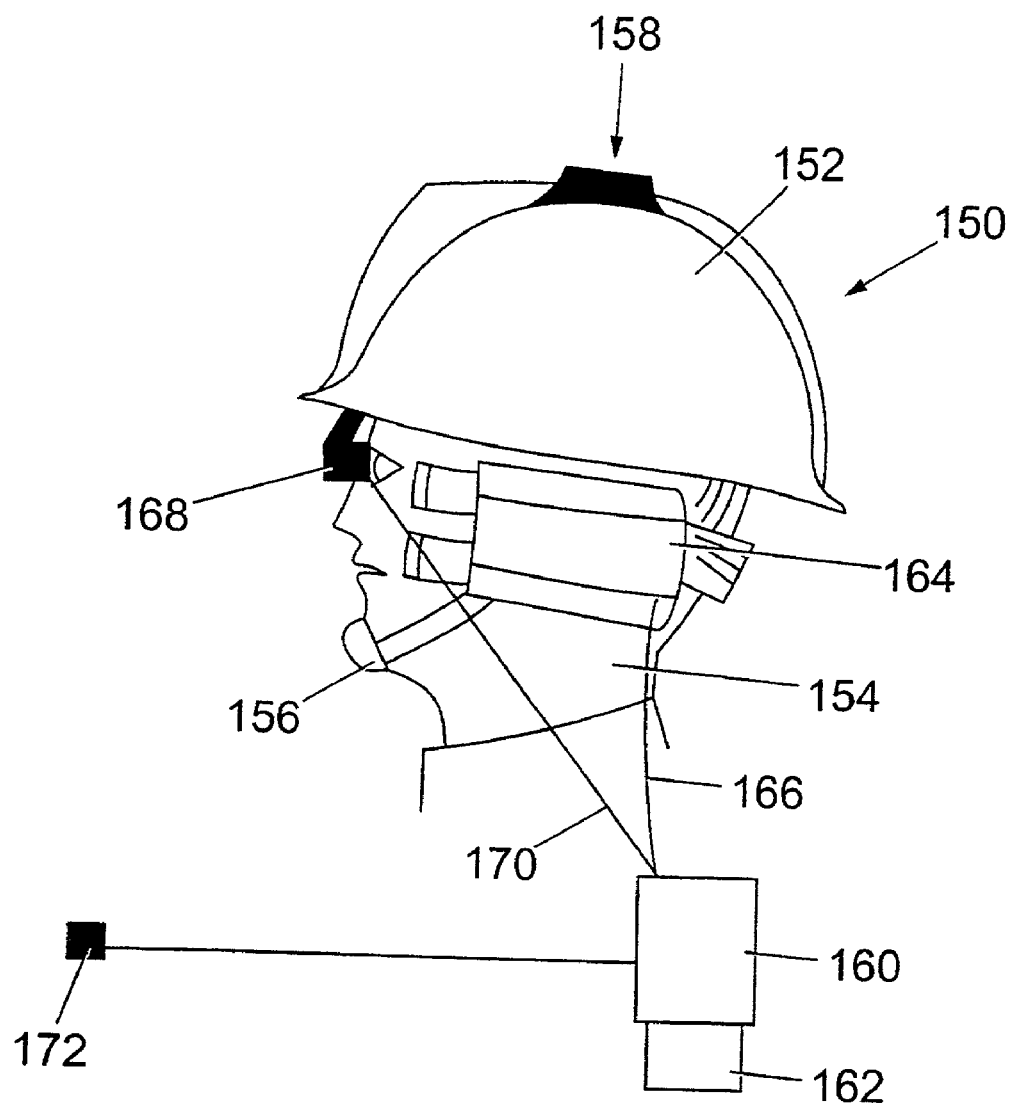
Figure 19A:
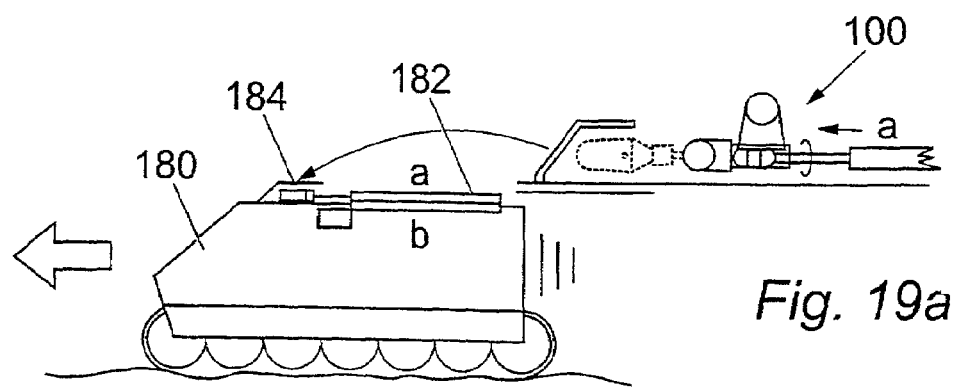
Figure 19B:
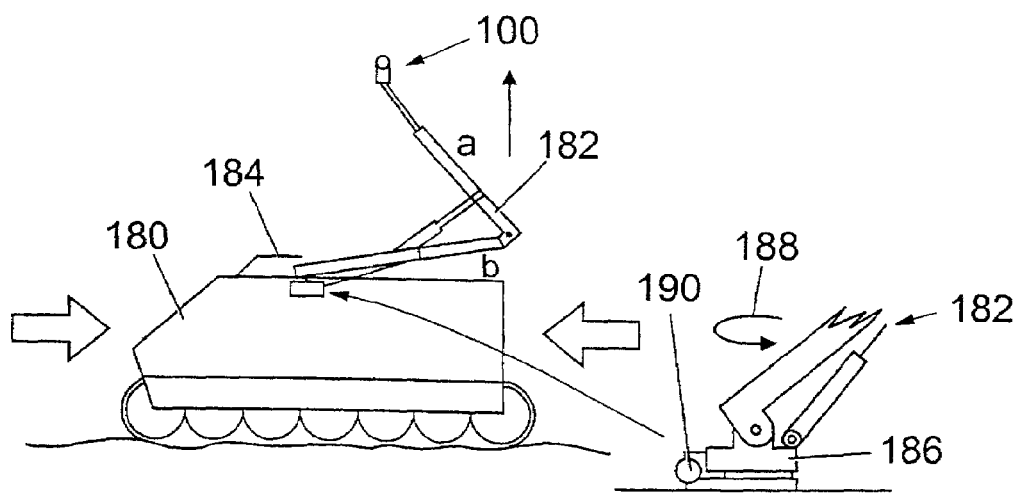
Figure 19C:
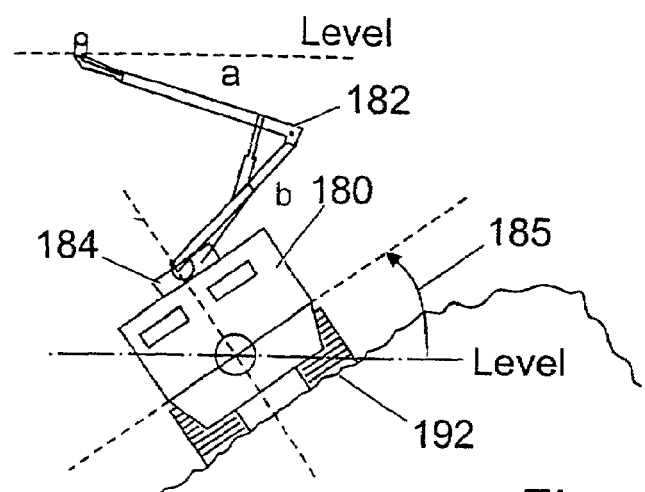
Figure 20A:
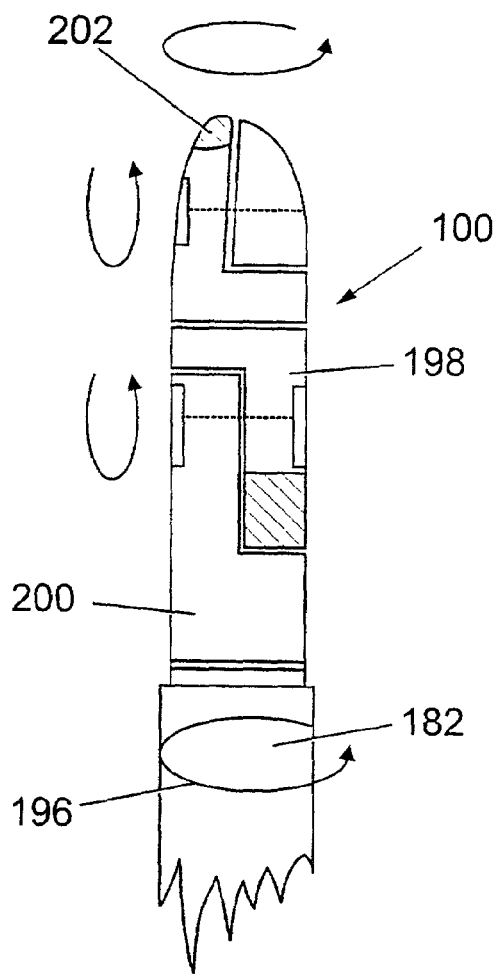
Figure 20B:
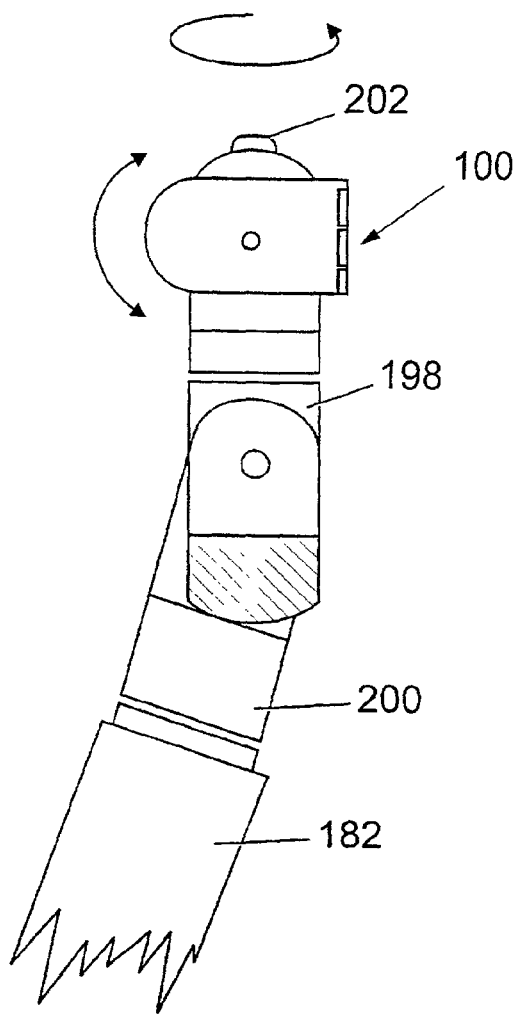
Figure 21A:
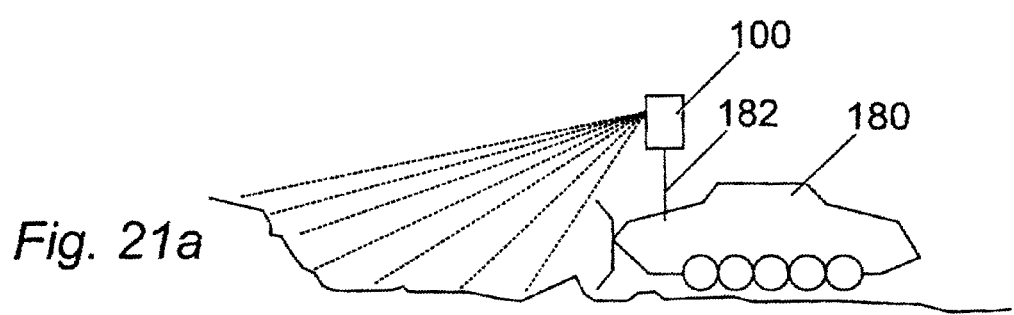
Figure 21B:
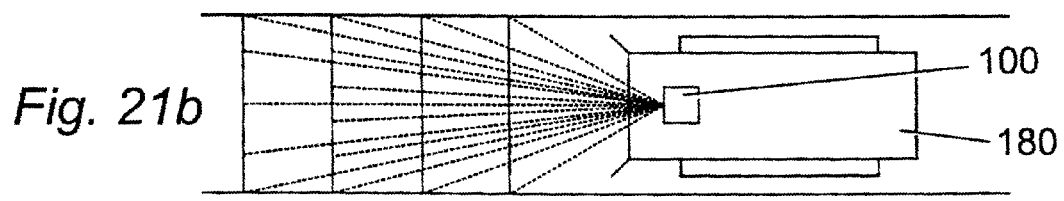
Figure 22:
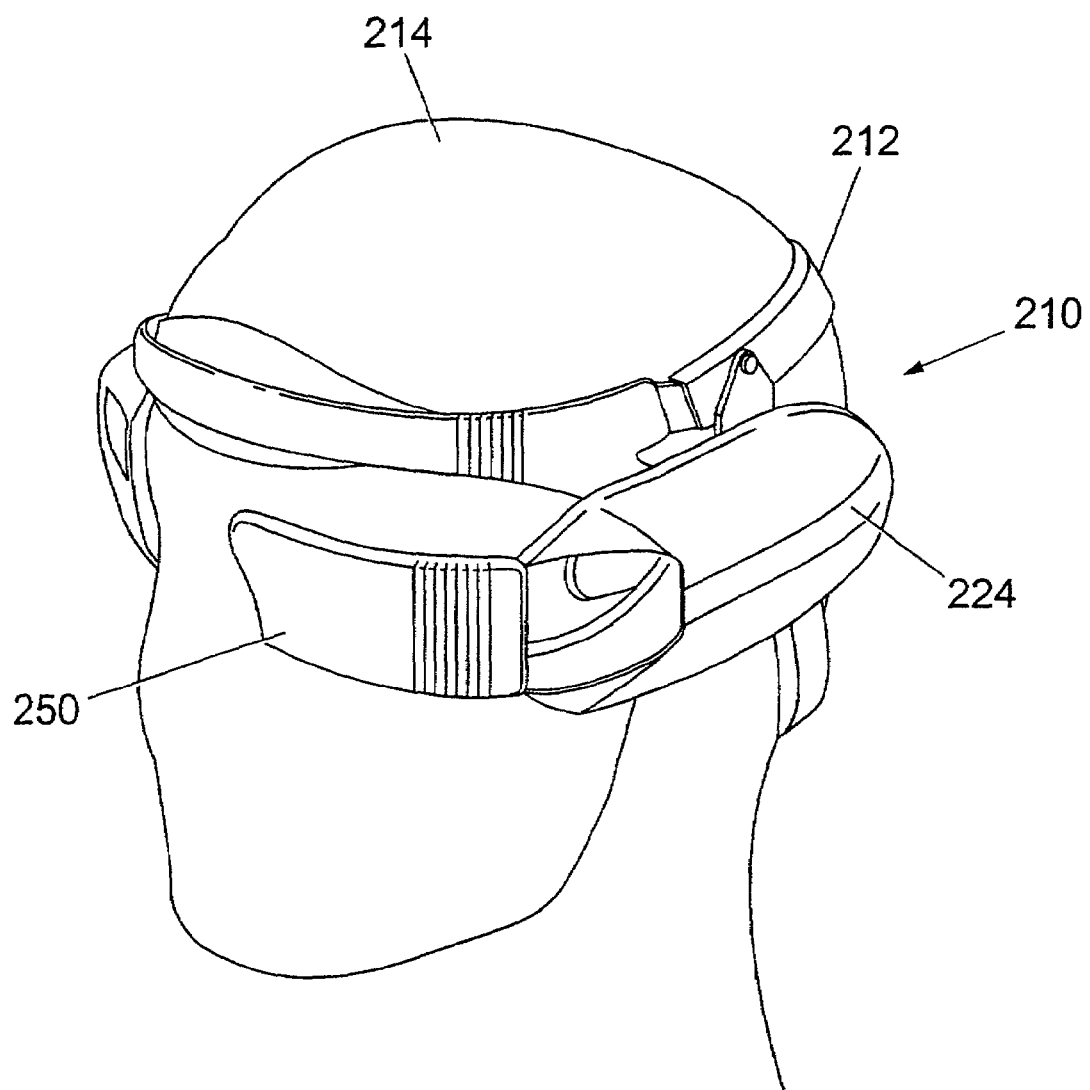
Figure 23:
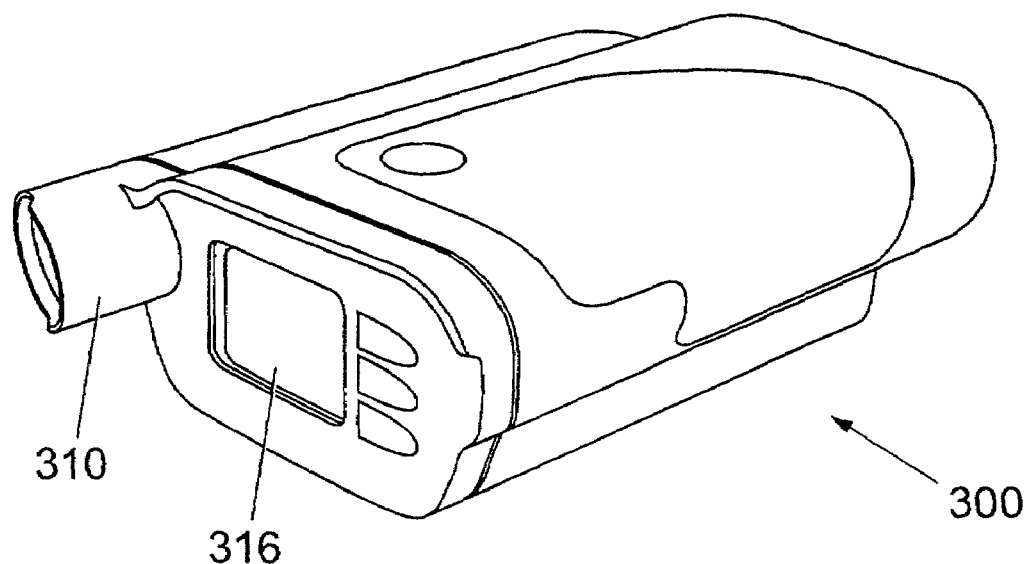
Figure 24:
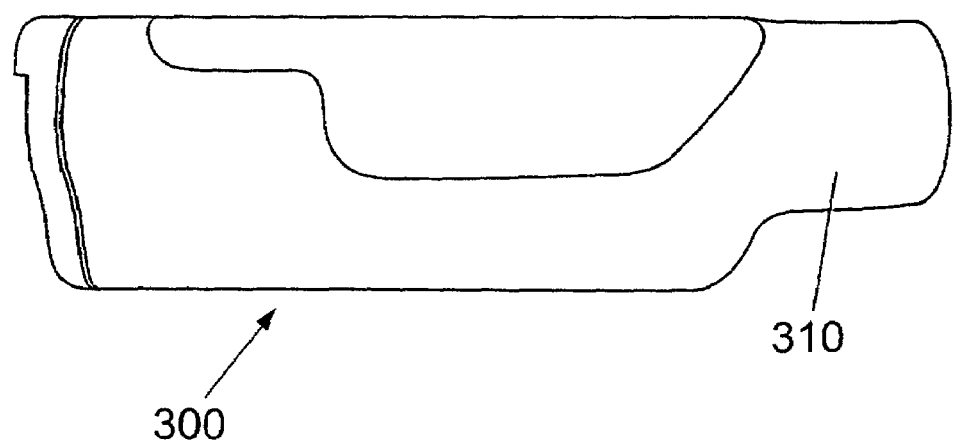
Figure 25:
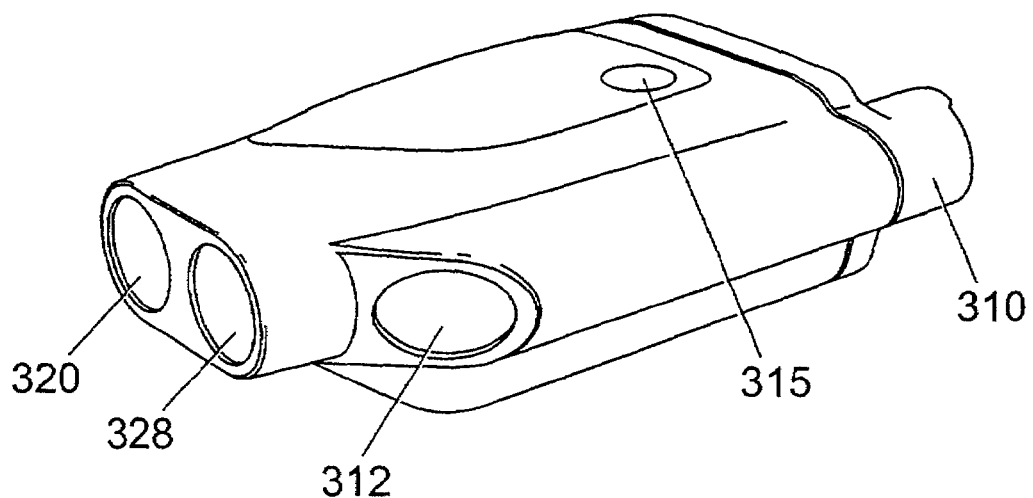
Figure 26:
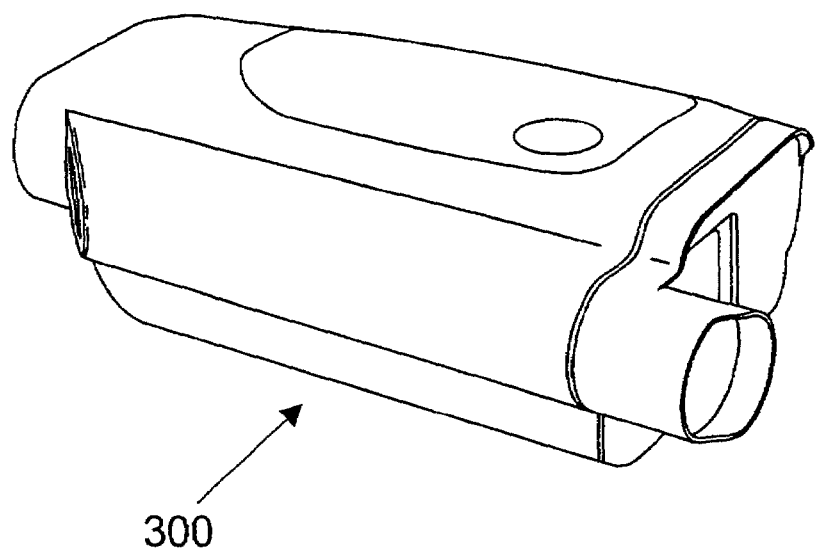
Figure 27:
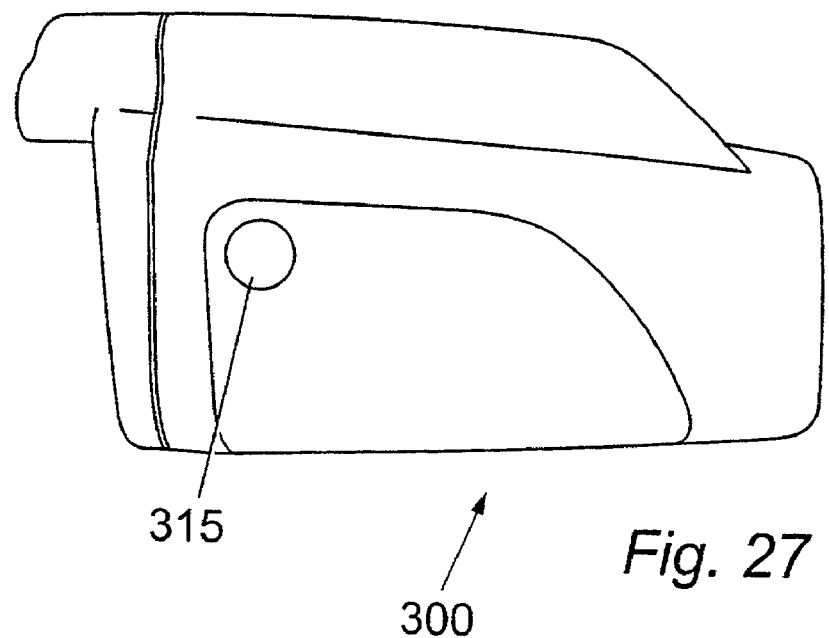
Figure 28:
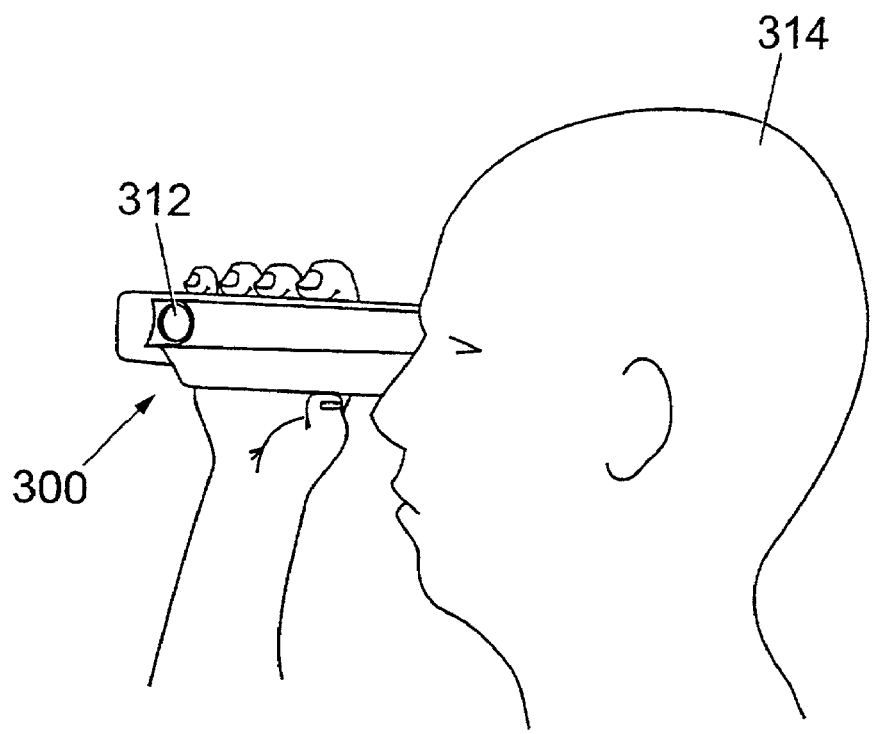
Figure 29:
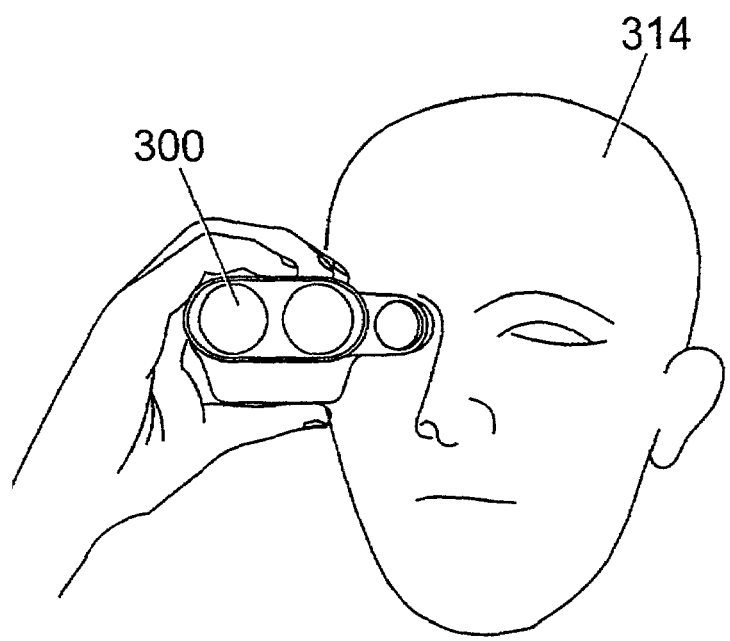
Figure 30:
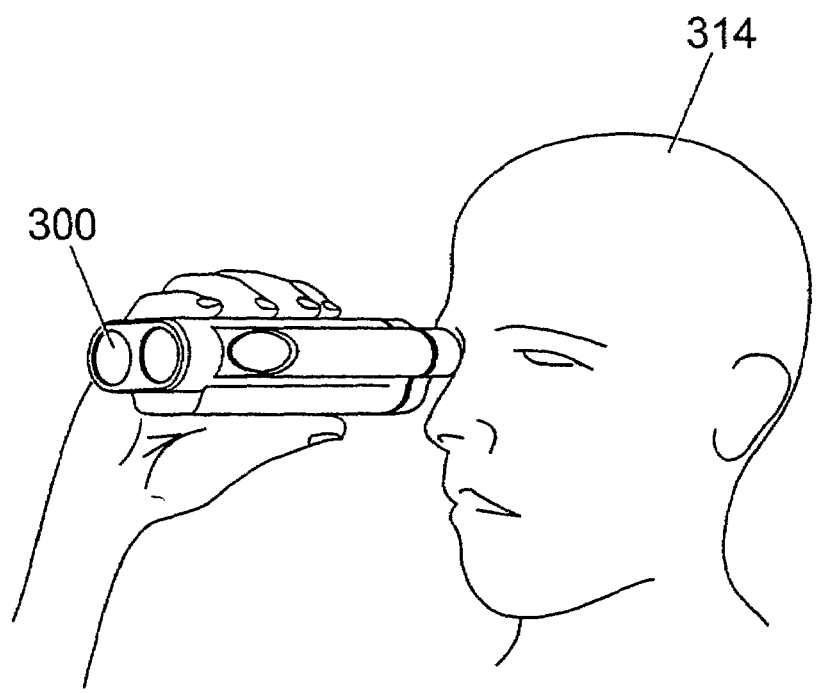

FIG. 5 schematically shows the apparatus of FIGS. 2 and 3 in use;

FIG. 6 is a schematic representation of the display produced on a computer screen of a freeze frame image produced by a digital camera;

FIG. 7 is a simplified schematic diagram of inside a digital camera;

FIG. 8 is a simplified diagram illustrating how a principal distance (PD) may be calculated;

FIG. 9 is a simplified diagram illustrating the offset between the laser and the camera in use;

FIG. 10 is a schematic representation illustrating a horizontal offset $H_{offset}$ outwith the camera;

FIG. 11 is a schematic representation illustrating a horizontal distance $l_x$ in terms of pixels, corresponding to $H_{offset}$ within the camera;

FIG. 12 is a simplified diagram of a freeze frame image showing an object;

FIG. 13 is a schematic representation illustrating the relationship between a horizontal distance $d_x$, a principal distance PD and an angle $\theta$;

FIG. 14 is a simplified diagram illustrating the principle of calculating pixel x and y co-ordinates from horizontal and vertical angles of and range to the pixel;

FIG. 15 is a simplified diagram illustrating the relationship between horizontal and vertical angles of and range to the pixel and three dimensional co-ordinates of the pixel;

FIG. 16 is a print of the triangular framework used to recreate a 3D image of a bitmap photograph;

FIG. 17 shows a print of a 3D image which used a bitmap photograph superimposed on the framework of FIG. 16;

FIG. 18 is a representation of an alternative mounting device for the apparatus according to a first aspect of the present invention;

FIG. 19a is a schematic representation of a vehicle provided with an elevating arm and apparatus showing the position of the apparatus when the vehicle is moving;

FIG. 19b is a schematic representation of the vehicle of FIG. 19a with the apparatus deployed on the arm;

FIG. 19c is a schematic representation of the vehicle of FIGS. 19a and 19b on a slope with the apparatus deployed on the arm;

FIGS. 20a and 20b are respective rear and side views of the apparatus deployed on the arm;

FIGS. 21a and 21b are respective side and plan elevations of the vehicle of FIGS. 15a to 15c illustrating the apparatus being used to profile the ground in front of the vehicle;

FIG. 22 is a schematic view of a second embodiment of a mounting device;

FIGS. 23 to 27 show a hand-held housing for the apparatus according to a first aspect of the present invention; and FIGS. 28 to 30 show the hand-held housing of FIGS. 23 to 27 in use.

Figure 1:
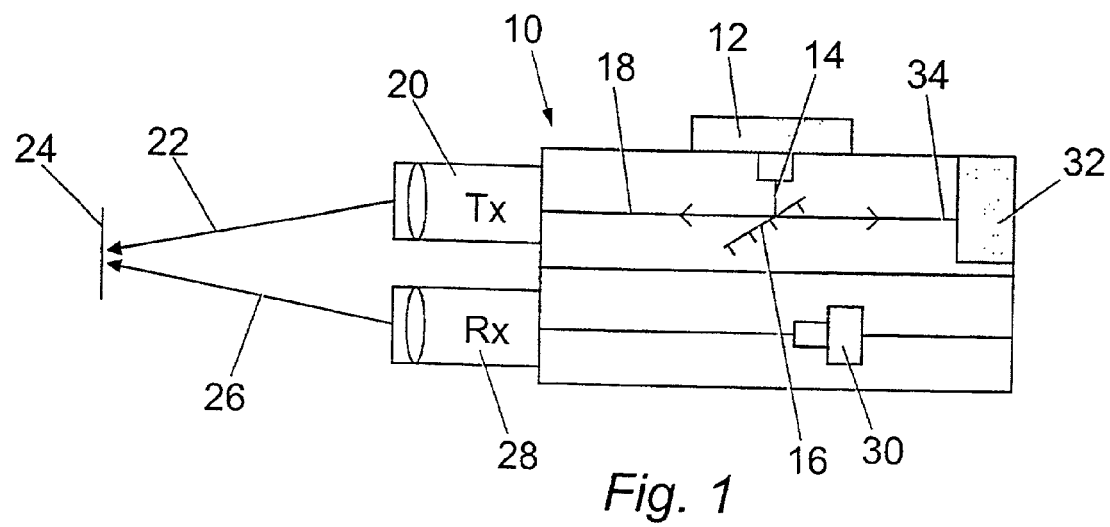
FIG. 1 is a schematic representation of an image capture and laser transmitter and receiver unit in accordance with, and for use with, the present invention.

Referring to the drawings, FIG. 1 shows a schematic representation of an image capture and laser transmitter and receiver unit 10 which forms part of the apparatus in accordance with a first aspect of the present invention. Unit 10 includes a laser 12 (which typically forms part of a laser range finder), where the laser 12 generates a beam of laser light 14. The laser 12 is typically an invisible, eyesafe, gallium arsenide (GaAs) diode laser which emits a beam typically in the infra-red (ie invisible) spectrum. The laser 12 is typically externally triggered and is typically capable of measuring distances up to, or in excess of, 1000 meters (1 km). It should be noted that any suitable type of laser may be used.

The beam 14 is reflected by a part-silvered prism 16 in a first direction substantially perpendicular to the direction of the initial beam 14, thereby creating a transmit beam 18. The transmit beam 18 enters a series of transmitter optics 20 which collimates the transmit beam 18 into a target beam 22. The target beam 22 is reflected by a target (schematically shown in FIG. 1 as 24) and is returned as a reflected beam 26. The reflected beam 26 is collected by a series of receiver optics 28 and directs it to a laser light detector 30. The axes of the transmit and receiver optics 20, 28 are calibrated to be coincident at infinity.

Signals from the detector 30 are sent to a processor (not shown in FIG. 1), the processor typically forming part of a computer. The processor calculates the distance from the unit 10 to the target 24 using a time-of-flight principle. Thus, by dividing the time taken for the light to reach the target 24 and be reflected back to the detector 30 by two, the distance to the target 24 may be calculated.

A digital video camera 32 is bore-sighted with the laser 12 (using the part-silvered prism 16). The camera 32 is preferably a complementary metal-oxide silicon (CMOS) camera which is formed on a silicon chip. The chip generally includes all the necessary drive circuitry for the camera. The camera 32 may be a zoom CCD (charge coupled device) camera such as a SONY EVI-371 which is designed for use in camcorders. The CCD chip is provided with 752 by 582 image cells, with a cell size in the order of 6.5 microns in the horizontal direction and 6.25 microns in the vertical direction. The lens can zoom from 5.4 millimeters (mm) to 64.2 mm focal length in 12 optical settings.

It should be noted that the camera 32 need not be bore-sighted with the laser 12. Where the camera 32 is not bore-sighted with the laser 12, the axis of the laser 12 will be offset from the axis of the camera 32 in the x and/or y directions. The offset between these axes can be calculated and the apparatus calibrated (eg using software) to take account of these offsets. However, where the camera 32 and the laser 12 are bore-sighted (as in FIG. 1) there is no requirement to take account of the offset in any subsequent calculations. The camera 32 is advantageously capable of zoom functions as this facilitates selection of targets at distances up to, or in excess of, 1 km.

The transmit optics 20 serve a dual purpose and act as a lens for the camera 32. Thus, light which enters the transmit optics 20 is collimated and directed to the camera 32 (shown schematically at 34) thereby producing an image of the target 24 at the camera 32. The image which the camera 32 receives is digitised and sent to a processor (not shown in FIG. 1). It will be appreciated that a separate lens may be provided for the camera 32 if required.

The frame grabber may be of any suitable type, for example a CREATIVE BLASTER IE500 imaging card (not shown). This card digitises both fields of the composite video input from the camera 32 and generates a digital image therefrom.

Referring now to FIGS. 2 and 3, FIG. 2 shows schematically a first embodiment of apparatus 100 mounted for movement in x and y directions (ie pan and tilt), and FIG. 3 shows an exploded view of the apparatus 100 of FIG. 2 in more detail.

Referring firstly to FIG. 2, the image capture and laser transmitter and receiver unit 10 (FIG. 1) is typically mounted within a casing 50. The casing 50 is typically mounted to a U-shaped yoke 52, yoke 52 being coupled to a vertical shaft 54. Shaft 54 is rotatably mounted to facilitate rotational movement (indicated by arrow 56 in FIG. 2) of the casing 50 in a horizontal plane (indicated by axis 58) which is the x-direction (ie pan). The rotational movement of the shaft 54 (and thus the yoke 52 and casing 50) is controlled by a motor 60 coupled to the shaft 54, typically via a gearbox (not shown in FIG. 2). The operation of the motor 60 is controlled by the computer.

The angle of rotation of the casing 50 in the horizontal plane (ie panning of the unit 10 in the x-direction) is measured accurately by a first digital encoder 62, attached to the shaft 54 in a known manner, which measures the angular displacement of the casing 50 (and thus the transmit laser beam 22) in the x-direction.

Similarly, the yoke 52 allows the casing 50 (and thus the transmit laser beam 22) to be displaced in the y-direction as indicated by arrow 64. The casing 50 is mounted to the yoke 52 via a horizontal shaft 66.

Shaft 66 is rotatably mounted to facilitate rotational movement (indicated by arrow 64 in FIG. 2) of the casing 50 in a vertical plane (indicated by axis 68) which is the y-direction (ie tilt). The rotational movement of the shaft 66 (and thus the yoke 52 and casing 50) is controlled by a motor 68 coupled to the shaft 56, typically via a gearbox (not shown in FIG. 2). The operation of the motor 66 is controlled by the computer.

The angle of rotation of the casing 50 in the vertical plane (ie tilting of the unit 10 in the y-direction) is measured accurately by a second digital encoder 70, attached to shaft 66 in a known manner, which measures the angular displacement of the casing 50 (and thus the transmit laser beam 22) in the y-direction. Thus, the motors 60, 68 provide for panning and tilting of the casing 50.

The output of the first and second encoders 62, 70 is electrically coupled to the computer to provide a feedback loop. The feedback loop is required because the motors 60, 68 are typically coupled to the shafts 54, 66 via respective gearboxes and are thus not in direct contact with the shafts 54, 66. This makes the movement of the casing 50 which is effected by operation of the motors 60, 68 less accurate. However, as the encoders 62, 70 are coupled directly to their respective shafts 54, 66 then the panning and tilting of the casing in the x- and y-directions can be measured more accurately, as will be described.

The embodiment of the image capture and laser transmitter and receiver unit 10 shown in FIG. 2 is slightly different from that illustrated in FIG. 1. The camera 32 within unit 10 is not bore-sighted with the laser 12, and thus casing 50 is provided with a camera lens 72, a laser transmitter lens 74 and a laser receiver lens 76. It should be noted that the laser transmitter lens 74 and the camera lens 72 may be integrated into a single lens as illustrated in FIG. 1. Ideally, the camera lens 72, laser transmitter lens 74 and laser receiver lens 76 would be co-axial. This could be achieved in practice by mechanically adjusting the lenses 72, 74, 76 to make them co-axial. However, this is a time consuming process and the offsets between the lenses can be calculated and the apparatus can be calibrated to take these offsets into account, as will be described. This calibration is generally simpler and quicker than mechanically aligning the lenses 72, 74, 76.

Referring to FIG. 3, there is shown in more detail the apparatus of FIG. 2. It should be noted that the casing 50 which houses the image capture and laser transmitter and receiver unit 10 is not provided with a separate camera lens 72 (as in FIG. 2). It should also be noted that the casing 50 in FIG. 3 is mounted to facilitate rotational movement in the x-direction (pan), but can be manually tilted in the y-direction (tilt) or can be adapted to the configuration shown in FIG. 2 for motorised pan and tilt.

As can be seen more clearly in FIG. 3, the casing 50 is mounted to the U-shaped yoke 52. The yoke 52 is coupled to the shaft 54 using any conventional means such as screws 80. The shaft 54 is driven by the stepper motor 60 via a worm/wheel drive gearbox 82. The digital encoder 62 is provided underneath a plate 84 through which the shaft 54 passes and to which the gearbox/motor assembly is attached. Plate 84 also includes a rotary gear assembly 86 which is driven by the motor 60 via the worm gearbox 82 to facilitate rotational movement of the shaft 54.

The motor, gearbox and shaft assembly is mounted within an aluminium casing 86, the casing 86 also having a rack 88 mounted therein. The rack 88 contains the necessary electronic circuitry for driving and controlling the operation of the apparatus, and includes a stepper motor driver board 90, a laser control board 92 and an interface board 94.

Figure 4:
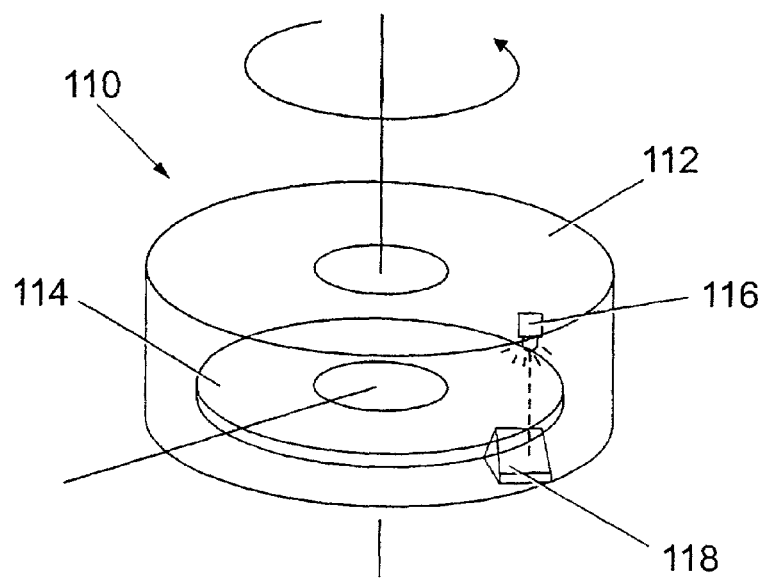
FIG. 4 shows a simplified schematic illustration of a digital encoder.

The first and second digital encoders 62, 70 may be of any conventional type, such as Moir Fringe, barcode or mask. Moir fringe type encoders are typically used as they are generally more accurate. FIG. 4 shows a simplified schematic illustration of a digital encoder, generally designated 110. Encoder 110 typically comprises a casing 112 in which a disc 114 is rotatably mounted. The disc 114 is provided with a pattern and is typically at least partially translucent. The type of pattern defined on the disc 114 determines the type of encoder.

A light emitting diode (LED) 116 is suspended above the disc 114 and emits a light beam (typically collimated by a lens (not shown) which shines through the disc 114. The light emitted by the LED 116 is detected by a detector, typically a cell array 118. As the disc 114 rotates (in conjunction with the shaft to which it is coupled) a number of electrical outputs are generated per revolution of the disc 114 by the cell array 118 which detects the light passing through the disc 114 from the LED 116. These types of encoders usually have two output channels (only one shown in FIG. 4) and the phase relationship between the two signals can be used to determine the direction of rotation of the disc 114.

The encoder 110 produces a pulse output per unit of revolution. Thus, as the disc 114 rotates, the pattern on the disc 114 causes electrical pulses to be generated by the cell array 118 in response to the pattern on the disc 114. These pulses can be counted and, given that one pulse is proportional to a certain degree of rotation, the angular rotation of the disc 114 and thus the shaft 54 can be calculated.

In use, the unit 10 is typically externally triggered by an input device such as a push button, keyboard, penpad or the like. When the apparatus is triggered, the camera 32 captures a digitised image of the target area. The digitised image is made up of a plurality of pixels, the exact number of which is dependent upon the size of the image produced by the camera. Each pixel has an associated x and y co-ordinate which relate to individual positions in the target area. The processor is then used to sequentially scan the laser 12 (by moving the part-silvered prism 16 accordingly, or by using the motors 60, 68 in the FIG. 5 embodiment) to measure the distance (range) to each successive point in the target area given by the x and y co-ordinates of the digitised image. This can then be used to create three-dimensional co-ordinates (ie x, y and z) to allow a three-dimensional image of the target area to be produced, as will be described.

FIG. 5 shows the apparatus 100 (schematically represented in FIG. 5 but shown more clearly in FIGS. 2 and 3) in use. The apparatus 100 is controlled and operated using software installed on the computer (shown schematically at 120) via a cable 122, telemetry system or other remote or hardwired control. An image of the target is displayed on the computer screen using the camera 32 (FIG. 1) and is schematically shown as image 124 in FIG. 5. When the image 124 of the target area of interest is viewed on the screen, the user of the apparatus 100 instructs the camera 32 (included as part of the apparatus 100) to take a freeze frame image of the target area. The freeze frame image 124 is a digital image made up of a plurality of pixels and FIG. 6 is a schematic representation of the display produced on the computer screen of the freeze frame image 124. The image 124 is typically divided into an array of pixels, with the image containing, for example, 200 by 200 pixels in the array.

Each pixel within the array has an x and y co-ordinate associated with it using, for example, the centre C of the picture as a reference point. Thus, each pixel within the digital image can be individually addressed using these x and y co-ordinates.

The individual addresses for each pixel allow the user to select a particular object (for example a tree 126) within the digital image 124. The tree 126 can be selected using a mouse pointer for example, where the mouse pointer is moved around the pixels of the digital image by movement of a conventional mouse provided with the computer in a known manner. The x and y co-ordinates of each pixel may be displayed on the screen as the mouse pointer is moved around the image. Clicking the mouse button with the pointer on the tree 126 selects a particular pixel 128 within the array which is identified by its x and y coordinates.

The computer is then used to calculate the horizontal angle $H_A$ and the vertical angle $V_A$ (FIG. 6). The horizontal angle $H_A$ and the vertical angle $V_A$ are the relative angles between the centre point C of the image and the pixel 128, as schematically shown in FIG. 6.

The methodology for calculating the horizontal angle $H_A$ and the vertical angle $V_A$ from the pixel x, y co-ordinates is as follows. FIG. 7 is a simplified schematic diagram of inside the camera 32 which shows the camera lens 72 and a charge-coupled device (CCD) array 130. The camera 32 is typically a zoom camera which therefore has a number of focal lengths which vary as the lens 72 is moved towards and away from the CCD array 130.

Referring to FIG. 7, the angles of horizontal and vertical views, or the field of view in the horizontal and vertical direction $\theta_H$, $\theta_V$ ($\theta_V$ not shown in FIG. 7) can be calibrated and calculated at different focal lengths of the camera 32. For simplicity, it is assumed that the CCD array 130 is square, and thus the field of view in the horizontal and vertical directions $\theta_H$, $\theta_V$ will be the same, and thus only the field of view in the horizontal direction $\theta_H$ will be considered. The methodology described below considers one zoom position only.

Having calculated (or otherwise obtained eg from the specification of the camera 32) the field of view in the horizontal direction $\theta_H$ then the principal distance PD (in pixels) can be calculated. The principal distance PD is defined as the distance from the plane of the lens 72 to the image plane (ie the plane of the CCD array 130).

Referring to FIG. 8, if the image width on the CCD array is defined as $H_R$, then using basic trigonometry $\tan(\theta_H/2) = H_R/(2PD)$. Thus, $$PD = H_R/(2(\tan(\theta_H/2)))$$

If the distance between each pixel in the image 124 in a certain unit (ie millimeters) is known, then the principal distance PD can be converted into a distance in terms of pixels. For example, if the field of view in the horizontal and vertical angles $\theta_H$, $\theta_V$ is, for example 10°, and the image contains 200 by 200 pixels, then moving one twentieth of a degree in the x or y direction is the equivalent of moving one pixel in the x or y direction.

When initially using the apparatus 100, the camera 32 is used to take a calibration freeze frame image and the laser 12 is activated to return the range R to the centre point C of the image. However, the laser axis is typically offset from the camera axis. The horizontal and vertical offsets between the laser axis and the camera axis when the freeze frame image is taken are defined as $H_{offset}$ and $V_{offset}$ and are known. Knowing the range R and the horizontal and vertical offsets $H_{offset}$, $V_{offset}$ allows the offset horizontal and vertical distances $l_x$ and $l_y$ in terms of pixels to be calculated. Referring to FIG. 9, the centre point C of the image 124 taken by the camera 32 and the laser spot 132 where the transmit laser beam 22 hits the target area is typically offset by the horizontal and vertical distances $l_x$ and $l_y$.

FIG. 10 is a schematic representation illustrating the horizontal offset $H_{offset}$ outwith the camera 32, and FIG. 11 is a schematic representation illustrating the horizontal distance $l_x$ in terms of pixels, corresponding to $H_{offset}$, within the camera 32. Referring to FIGS. 10 and 11 and using basic trigonometry, $$\tan \theta = H_{offset}/R$$

and, $$l_x = PD(\tan \theta)$$

Thus, $$l_x = PD(H_{offset}/R)$$

and it follows that $$l_y = PD(V_{offset}/R)$$

If the range to a certain object within the target area (such as the tree 126 in FIG. 6) is required, then the computer must calculate the horizontal and vertical angles $H_A$, $H_V$ through which the casing 50 and thus the laser beam 22 must be moved in order to target the object.

The user selects the particular pixel (relating to the object of interest) within the image using a mouse pointer. In FIG. 12, the selected object is represented by pixel A which has coordinates (x, y), and the laser spot 132 has coordinates ($l_x$, $l_y$) calculated (eg by the computer 120) using the previous method. The coordinates (x, y) of point A are already known (by the computer 120) using the coordinates of the pixel array of the image.

If the horizontal distance between pixel A and the laser spot 132 is defined as $d_x$, and similarly the vertical distance between pixel A and the laser spot 132 is defined as $d_y$, then $$d_x = x - l_x$$

and $$d_y = y - l_y,$$

and it follows that the horizontal and vertical angles $H_A$, $V_A$ can be calculated as $$H_A = \text{inverse } \tan(d_x/PD)$$

and $$V_A = \text{inverse } \tan (d_y/PD).$$

Referring back to FIG. 2, having calculated the horizontal and vertical angles $H_A$, $V_A$ through which the casing 50 must be rotated to measure the range to the object A, the computer 120 instructs the motor 60 to pan through an angle of $H_A$ and simultaneously instructs the motor 68 to tilt through an angle of $V_A$. Thus, the transmit laser beam 22 is directed at the object A selected by the user to determine the range to it.

However, the motors 60, 68 are not directly coupled to the shafts 54, 66 (but via respective gearboxes) and thus can have errors which results in the laser beam 22 not being directed precisely at the object A. However, the encoders 62, 70 can be used to measure more precisely the angles $H_A$ and $V_A$ through which the casing 50 was panned and tilted. If there is a difference between the measured angles $H_A$ and $V_A$ and the angles which were calculated as above, the computer can correct for this and can pan the casing 50 through an angle $H_{AC}$ which is the difference between the calculated angle $H_A$ and the measured angle $H_A$, and similarly tilt the casing 50 through an angle $V_{AC}$ which is the difference between the calculated angle $V_A$ and the measured angle $V_A$. The process can then be repeated by using the encoders 62, 70 to check that the casing 50 has been panned and tilted through the angles $H_{AC}$ and $V_{AC}$. If there is a difference again, then the process can be repeated to further correct for the errors introduced. This iteration process can be continued until the output from the encoders 62, 70 corresponds to the correct angles $H_A$ and $V_A$. The laser 12 is then fired to give the range to the object A.

The calibration process described above is typically an automated process for the calibration of the interior and exterior parameters of the camera. The calibration process typically determines the accuracy of the measurements and the realism of the three dimensional image produced. The main function of the calibration process is to calibrate a principal point PP and the principal distance PD using image-processing techniques.

The principal point PP is based on the assumption that the optical axis of the camera 32 is straight so that the principal point PP for all zoom lenses falls at one point on the image. When the camera 32 zooms in, the targets on the image move towards the centre of the image. The intersection of all target paths, whilst zooming, is considered as the principal point PP. The control program used for the automatic calibration process enables the user to select targets whilst zooming in and out. The processor then calculates the average of the intersections of all target paths, which is considered as the principal point PP. The principal point PP is typically calculated several times and the average of these calculations is taken to be the principal point PP.

The principal distance PD varies with zoom lenses. At each zoom position, the calibration begins with pointing the apparatus 100 so that the central part of the image is filled with the target area. The central part of the image is typically a rectangle. The angular readings of the apparatus (eg from the encoders 62, 70) are recorded. A pixel with the most unique surrounding features within the central part is selected as a target point and its image and coordinates are recorded as described above. This target point typically has the most features and should be relatively easy to match.

The apparatus 100 is then panned and/or tilted to five positions along the four main directions; that is up, down, left and right. At each position, a corresponding image is grabbed using the imaging card (frame grabber) and the camera 32 and the angular settings (eg from the encoders 62, 70) of the apparatus 100 are recorded. The central part of the image is then moved to enclose the moved target point by best estimate from the previous calibration data. The target point is then searched and located with sub-pixel precision by area-based matching techniques. A check may be performed using, for example, back matching to discard unreliable matchings. If both horizontal and vertical directions have four matches discarded in this manner, recalibration is suggested. At least seven sets of locations of the target (including the initial target location) with respect to the angular settings of the apparatus 100 can be obtained along the horizontal and vertical directions. If the calibration results in the horizontal and vertical directions are valid, the average value is taken. A further check on the reliability of the matching can be conducted on the basis of least squares solution.

This calibration method can be conducted automatically without the need for setting special targets which enables the user to carry out the procedure at any time. It also facilitates regular instrument check-up.

The automation without the use of set targets greatly reduces the cost of the calibration and considerably increases the ease of use of the calibration utility.

Referring again to FIG. 6, to obtain a three dimensional (3D) image of the tree 126, the user can select a number of pixels around the outline of the tree 126. This selection limits the number of points which are used to create a 3D image. It should be noted however, that a 3D representation of the whole image 124 can be created.

Having selected the outline of the target (ie tree 126), the software provided on the computer 120 instructs the motors 60, 68 to pan and tilt the unit 10 through respective horizontal and vertical angles $H_A$, $V_A$ corresponding to the pixels within the tree 126 (or the entire image 124 as required). The same iterative process as described above can be used to ensure that the laser 12 is accurately directed to each of the pixels sequentially. At each pixel, the laser 12 is activated to obtain the range R to each of the pixels within the tree 126, as previously described.

Once the horizontal and vertical angles $H_A$, $V_A$ and the range R of each of the pixels is known, the processor within the computer 120 can then be used to calculate the 3D co-ordinates of the pixels within the tree 126 to recreate a 3D image of the tree 126.

Referring to FIG. 14, the central laser spot 132 has an offset $l_x$ and $l_y$ as described above, and also has horizontal and vertical angles $H_o$, $V_o$ and range $R_o$. Determination of the pixel x and y coordinates $p_x$, $p_y$ for the point A which has horizontal and vertical angles H, V and range R, can be done as follows using basic trigonometry. It should be noted that the field of view in the horizontal and vertical directions $\theta_H$, $\theta_V$, the principal distance PD and the horizontal and vertical distances $l_x$ and $l_y$ are either all known or can be calculated as described above.

$$p_x - l_x = PD \tan(H - H_o)$$

and $$p_y - l_y = PD \tan(V - V_o).$$

It thus follows that $$p_x = l_x + PD \tan(H - H_o)$$

and $$p_y = l_y + PD \tan(V - V_o).$$

Thereafter, the 3D coordinates x, y, z for the point A can be calculated, as will be described with reference to FIG. 15.

Using trigonometry, $$x = R \cos V \cos H$$

$$y = -R \cos V \sin H$$

and $$z = R \sin V$$

These calculations can then be repeated for each pixel (defined by $p_x$, $p_y$) to give 3D coordinates for each of the pixels within the target (ie tree 126 or image 124). An array of pixel co-ordinates $p_x$, $p_y$ and the corresponding 3D coordinates x, y, z can be created and the processor within the computer 120 can be used to plot the 3D coordinates using appropriate software. Appendix A shows an exemplary array of pixel co-ordinates $p_x$, $p_y$ and the corresponding 3D coordinates x, y, z of a bitmap image which can be used to generate a 3D image.

Once the 3D coordinates have been plotted, the software then generates a profile of the 3D image using triangles to connect each of the 3D coordinates together, as shown in FIG. 16. FIG. 16 is a print of the triangular framework used to recreate a 3D image of a bitmap photograph. The bitmap image (ie the digital image taken by the camera 32) is then superimposed on the triangulated image to construct a 3D image of the target (ie tree 126 or image 124). FIG. 17 shows a print of a 3D image which used a bitmap photograph superimposed on the framework of FIG. 16. The 3D image of the target can typically be viewed from all angles using the software. Thus, the user can effectively walk around the tree 126. However, this may require a number of photographs (ie digital bitmap images taken by the camera 32) at different angles which can then be superimposed upon one another to create a full 360° 3D image. It should be noted that even when using only one photograph, the user can manipulate the 3D image to look at the tree 126 from all angles.

It should also be noted that having a bitmap (colour) image of the tree 126 (and image 124) allows accurate (true) colours to be assigned to each pixel within the image. Conventionally, colours are assigned from a palette which may not be the true and original colours.

The software may also be capable of allowing the user to select two points within the tree 126 and calculating the horizontal and vertical distances between the two points. Thus, it is possible for the user to determine, for example, the height of the tree by using the mouse to select a pixel at the top and bottom of the tree 126. If a building is plotted in 3D using the above methodology, the software can be used to determine the height, width and depth of the building, and also other parameters such as the length of a window, the height of a door and the like. To enable the used to select points more accurately, the software is advantageously provided with zoom capabilities.

The software may also be capable of plotting the profile of the tree using gradiented colours to show the horizontal distance, vertical distance and/or range to each of the pixels within the tree 126 or image 124.

Additionally, the software may be capable of allowing the user to select one or more points whereby a profile of the tree 126 in the plane selected can be shown. Additionally, the profiles in the x, y and z directions through one particular point within the image can also be plotted. It is also possible for the x, y and z axes to be superimposed on the image, and directional axes (ie north, south, east and west) can also be superimposed upon the image.

Instead of superimposing the bitmap (digital) image over the triangular wireframe, the software may be used to create a shaded image of the target and may also be capable of changing the position of the light which illuminates the target.

It will also be appreciated that the software can generate x, y and/or z contours which may be superimposed over the image.

Referring back to FIG. 5, the apparatus 100 can optionally include a Global Positioning System (GPS) (not shown). GPS is a satellite navigation system which provides a three-dimensional position of the GPS receiver (in this case mounted as part of the apparatus 100) and thus the position of the apparatus 100. The GPS is used to calculate the position of the apparatus 100 anywhere in the world to within approximately ±25 meters. The GPS calculates the position of the apparatus 100 locally using radio/satellite broadcasts which send differential correction signals to ±1 meter. The GPS can also be used to record the time of all measured data to 1 microsecond.

The apparatus 100 advantageously includes an inclinometer (not shown) and a fluxgate compass (not shown), both of which would be mounted within the casing 50 (FIG. 2). The fluxgate compass generates a signal which gives a bearing to the target and the inclinometer generates a signal which gives the incline angle to the target. These signals are preferably digitised so that they are in a machine-readable form for direct manipulation by the computer 120.

Thus, in addition to being used to find ranges to specific targets, the apparatus may also be used to determine the position of objects, such as electricity pylons, buildings, trees or other man-made or natural structures. The GPS system can be used to determine the position of the apparatus 100 anywhere in the world, which can be recorded. Optionally, the fluxgate compass within the casing 50 measures the bearing to the target, which can be used to determine the position of the target using the reading from the GPS system and the reading from the fluxgate compass.

The positional information, the bearing and the inclination to the target can optionally be superimposed on the 3D image.

It should also be noted that the encoders 62, 70 may be used to determine the bearing to the target instead of the fluxgate compass. In this case, if the encoder is given an absolute reference, such as the bearing to an electricity tower or other prominent landmark which is either known or can be calculated, then the angle relative to the reference bearing can be calculated using the outputs from the encoders 62, 70, thus giving the bearing to the target.

In addition, the position of the apparatus and the calculated position of the target could be overlayed on a map displayed on the computer screen so that the accuracy of the map can be checked. This would also allow more accurate maps to be drawn.

FIG. 18 shows an alternative embodiment of a mounting device for the apparatus generally designated 150. The apparatus 150 includes a hard-hat type helmet 152. The helmet 152 may be replaced by any suitable form of headgear, but is used to give a user 154 some form of protection during use. This is advantageous where the user 154 is working in hazardous conditions, such as on a building site, quarry or the like. The helmet 152 is typically held in place on the head of the user 154 using a chin strap 156.

Mounted within the helmet 152, and preferably integrally moulded therein, is a Global Positioning System (GPS) 158. The GPS 158 is a system which provides a three-dimensional position of the GPS receiver (in this case mounted within the helmet 152 on the user 154) and thus the position of the user 154. The GPS 158 is used to calculate the position of the user 154 anywhere in the world to within approximately ±25 meters. The DGPS calculates the position of the user 154 locally using radio/satellite broadcasts which send differential correction signals to ±1 meter. The GPS 158 can also be used to record the time of all measured data to 1 microsecond.

The GPS 158 is coupled to a computer (similar to computer 120 in FIG. 5) via a serial port. The computer may be located in a backpack 160, shown schematically in FIG. 18, or may be a portable computer, such as a laptop. The backpack 160 has a power source, such as a battery pack 162, either formed integrally therewith, or as an external unit.

Mounted on the helmet 152 is a housing 164 which encloses the range finder (as shown in FIG. 1), the video camera 32, an inclinometer (not shown) and a fluxgate compass (not shown). Signals from the range finder, camera 32, compass and inclinometer are fed to the computer in the backpack 160 via a wire harness 166.

The fluxgate compass generates a signal which gives a bearing to the target and the inclinometer generates a signal which gives the incline angle to the target. These signals are preferably digitised so that they are in a machine-readable form for direct manipulation by the computer.

The video camera 32 is preferably a charge-coupled device (CCD) camera. This type of camera operates digitally and allows it to be directly interfaced to the computer in the backpack 160. Signals from the camera 32 are typically input to the computer via a video card. The camera 32 may be, for example, a six-times magnification, monochrome camera with laser transmitter optics.

The view from the camera 32 is displayed on an eyepiece VGA monitor 168 suspended from the helmet 152. The monitor 168 is coupled to the computer in the backpack 160 via a second wire harness 170. The monitor 168 is used to display computer graphics and a generated graphics overlay.

The mounting of the monitor 168 on the helmet 152 is independent of the housing 164 and is thus adjustable to suit a plurality of individual users. A tri-axial alignment bracket (not shown) is provided for this purpose.

In use, software which is pre-loaded on the computer in the backpack 160 enables the user 154 to see a video image (provided by the camera 32) of the target on the monitor 168. The software can overlay the video image with a sighting graticule (not shown) and any measured data in a separate window.

It should be noted from FIG. 1 that the camera 32 and the laser range finder are bore-sighted. Conventional systems use an offset eyepiece sighting arrangement with an axis which is aligned and collimated to be parallel to the axis of the laser range finder. However, use of the camera 32 (which displays an image of the target area on the VGA monitor eyepiece 168) bore-sighted with the laser range finder provides the user 154 with an exact view of the target area using the camera 32. Thus, there is no need for a collimated eyepiece and the user 154 can be sure that the range finder will be accurately directed at the target. To further improve accuracy, computer controlled graticule offsets may be generated during a calibration and collimation procedure to eliminate residual errors of alignment between the laser range finder and the camera 32. These offset values may be stored in an erasable-programmable-read-only-memory (EPROM) for repetitive use.

Operation of the apparatus 150 is controlled by an input device 172 connected to the computer via a keyboard input. The input device 172 typically comprises a keyboard, keypad, penpad or the like, and controls different functions of the apparatus 150.

When an observation or survey is required of a particular target area, the user 154 views the target area using the camera 32 and the eyepiece monitor 168. The target area is aligned with the graticule typically using a small circle (not shown) or a cross as a guide.

The user 154 then fires the apparatus 150 using an appropriate key or button on the input device 172. The computer initiates the camera 32 which captures a digital image of the target area and scans the laser 12 to provide a 3D image of the target area as previously described. It should be noted that the panning and tilting of the laser 12 is not achieved by motors 60, 68 as in the FIG. 2 embodiment. In this example, the part-silvered prism 16 can be moved to scan the laser over the target to provide range information for each pixel within the target.

In addition, measurements of the various parameters such as bearing and incline to the target area are recorded, digitised and incorporated into the calculations made by the computer. The global position of the user 154 and the time of the measurement is also recorded from the GPS/DGPS 158.

The calculated and/or measured data is then sent from the computer to the monitor 168 and is displayed in a window of the image by refreshing the data therein. This allows the user 154 to see the measured data and confirm that the correct target area has been identified and accurately shot by reference to the freeze frame image and the overlaid data window and reticule.

The user 154 may then save either the data, image or both to the memory in the computer using an appropriate push button (not shown) on the input device 172. Multiple measurements of this nature may be recorded, for each pixel, thus giving 3D images of different target areas. These images may then be used to observe the target area either in real-time or later to assess and/or analyse any of the geographical features.

For example, one particular use would be by the military. During operations, a squad may be required to cross a river. The apparatus may be used to create multiple 3D images of possible crossing places, for example by deploying the apparatus on an elevated platform. These would then be assessed to select the best location for a mobile bridge to be deployed. The image may be viewed locally or could be transmitted in a digital format to a command post or headquarters anywhere in the world. Use of the apparatus would result in much faster and more accurate observations of the geographical locations and would avoid having to send soldiers into the area to visually assess the locations and report back. The apparatus may be deployed on an elevated platform and operated by remote control to decrease the risk to human users in hostile situations.

Referring to FIGS. 19a to 19c, there is shown a vehicle 180 (such as a tank) which is provided with the apparatus 100 of FIGS. 2 and 3 mounted on a telescopic or extendable arm 182. As illustrated in FIG. 19a, the apparatus 100 may be completely retracted when the vehicle 180 is in motion, and may be stored behind an armoured shield 184. The casing 50 of the apparatus 100 would tilt downwards to a horizontal attitude and the telescopic arm 182 would extend so that the apparatus 100 was substantially protected by the armoured shield 184.

When the area to be surveyed is reached, the vehicle is stopped and the apparatus 100 deployed on the telescopic arm 182 by reversing the procedure described above, as illustrated in FIG. 19b. The telescopic arm 182 is preferably mounted on a rotation joint 186 so that the apparatus 100 can be rotated through 360° as indicated by arrow 188 in the enlarged portion of FIG. 19b. A motor 190 is coupled to the rotation joint 186 to facilitate rotation of the joint 186. The apparatus 100 can typically be raised to a height of approximately 15 meters or more, depending upon the construction of the arm 182.

The particular configuration shown in FIGS. 19a and 19b can accommodate large angles of roll and pitch of the vehicle, such as that shown in FIG. 19c. In FIG. 19c, the vehicle 180 is stationary on a slope 192 and has been rolled through an angle indicated by arrow 185 in FIG. 19c. The user or the computer can correct for the angle of roll 185 by moving the arm 182 until the inclinometer indicates that the apparatus 100 is level. A level 198 (FIGS. 20a, 20b) may be provided on the base of the apparatus 100 if required.

FIGS. 20a and 20b are front and side elevations of the apparatus 100 mounted on the arm 182. As can be seen from FIGS. 20a and 20b, the arm 182 can be rotated through 360° as indicated by arrow 196 in FIG. 20a. The apparatus 100 is mounted on a pan and tilt head 200 to facilitate panning and tilting of the apparatus 100.

Servo motors within the pan and tilt head 200 pan and tilt the head 200 into the plane of roll and pitch of the vehicle 180 (FIG. 19c). Thereafter, the motors 60, 68 of the apparatus 100 pan and tilt the apparatus 100 until it is level, using the level indicator 198 as a guide.

Further electronic levels (not shown) within the apparatus 100 can measure any residual dislevelment and this can be corrected for in the software before any measurements are taken.

A particular application of the apparatus 100 deployed on a vehicle 180 would be in a military operation. The apparatus 100 can be deployed remotely on the arm 182 and used to survey the area surrounding the vehicle 180 to create a 3D real-time image of the terrain.

Alternatively, or additionally, the computer 120 could be provided with a ground modelling software package wherein the user selects a number of key targets within the area using the method described above, and finds the range and bearing to, height of and global position of (if required) these targets. The software package will then plot these points, including any heights which a GPS 202 (FIGS. 20a and 20b) can generate, and in-fill or morph the remaining background using digital images captured by the camera 32 to produce a 3D image of the terrain, as described above.

The surveying operation can be done discretely and in a very short time compared with conventional survey techniques and provides a real-time 3D image of the terrain. Once the terrain has been modelled, design templates of equipment carried by the vehicle 180 (or any other vehicle, aircraft etc) can be overlayed over the image to assess which type of equipment is required to cross the obstacle, such as a river.

Conventional techniques would typically require to deploy a number of soldiers to survey the area manually and report back. However, with the apparatus 100 deployed on the vehicle 180 the survey can be done quicker, more accurately and more safely, without substantial risk to human life.

It is possible to conduct multiple surveys with the vehicle 180 in one or more locations, with the data from each survey being integrated to give a more accurate overall survey of the surrounding area.

Furthermore, if the arm 182 was disposed at the front of the vehicle 160 as shown in FIGS. 21a and 21b, the apparatus 100 can be used to check the profile of the ground in front of the vehicle 180. Thus, the profile of the ground could be shown in 3D which would allow the driver of the vehicle (or other personnel) to assess the terrain and warn of any dangers or difficulties.

Alternatively, or additionally, the software on the computer 120 could be used to generate a head-up video display to which the driver of the vehicle 180 could refer. The heading of the tank (measured by the fluxgate compass) could also be displayed, with the range to and height of the ground (and any obstructions) in front of the vehicle 180 also being displayed. The height displayed could be the height relative to the vehicles' position, or could be the absolute height obtained from the GPS 202.

Another application of the apparatus 110 would be to capture images of electricity pylons for example by targeting each individually and saving the data for future reference (for example to allow their positions on a map to be plotted or checked) or to observe them in 3D to check for any faults or the like.

In addition to providing the 3D image of the target area, the computer may also calculate the position of the target area using the GPS/DGPS 158 (FIG. 18). The position of the user 154 is recorded using the GPS/DGPS 158, and by using the measurements such as bearing and inclination to the target area, the position of the target area may thus be calculated.

The apparatus provides a 3D image of the target area which, in a geographical format, may be used to update map information and/or object dimensions and positions. The software may overlay and annotate the measured information on background maps which may be stored, for example, on compact-disc-read-only-memory (CD-ROM) or any other data base, such as Ordinance Survey maps.

Using a separate function on the input device 172, the user can change the image on the monitor 168 to show either a plot of the user's position (measured by the GPS/DGPS 158) superimposed on the retrieved data base map, or to view updated maps and/or object dimensions and positions derived from the measurements taken by the apparatus 100.

FIG. 22 shows a concept design of an alternative apparatus 210. The apparatus 210 is mounted on a head band 212 which rests on the head of a user 214. Mounted on the headband 212 is a housing 224 which is attached to the headband 212. The housing 224 encloses the apparatus 100 (FIG. 5) as previously described. This particular embodiment incorporates an eyepiece monitor 250 into the housing 224.

FIGS. 23 to 30 show a hand-held housing for the apparatus. The hand-held device 300 includes an eyepiece 310 which is used to select the target area. Device 300 includes an image capture and laser transmitter and receiver unit 10 similar to that shown schematically in FIG. 1.

In use, a user 314 (FIGS. 28 to 30) puts the eyepiece 310 to his eye and visualises the target through a lens 312. When the target has been visualised, a fire button 315 is depressed which initiates the camera 32 (FIG. 1) to take a digital (two-dimensional) image of the target, which can be displayed on a small LCD screen 316. The laser range finder can then be used to determine the range to each pixel using the methodology described herein to allow a 3D image to be produced. It should be noted that the hand-held device 300 need not be capable of processing the 3D image. The range to each pixel can be recorded and stored in a file for transfer to a computer (provided with the appropriate software) which may be used to reproduce the 3D image. The device 300 is typically provided with a suitable interface for downloading, or may be provided with an alternative storage means such as an EPROM which may be removed from the device as required, or a floppy disc drive for example.

It will be apparent that the apparatus and method described herein can be used to produce three dimensional images of a plurality of different targets and may be used in a wide range of applications. These applications include quarry sites, onshore and offshore oil and gas installations, building sites including individual buildings or the like.

It will also be apparent that the apparatus and method described herein may be used for applications other than surveying, such as obtaining three dimensional images for computer games or the like.

Modifications and improvements may be made to the foregoing without departing from the scope of the invention.

The invention claimed is:

1. A method of generating a three-dimensional image of a target area, the method comprising the steps of:
    providing an imaging device,
    providing a range finder,
    operating the imaging device to provide an image of the target area,
    digitizing the image to provide a plurality of pixels within the digital image,
    calculating horizontal and vertical angles between a reference point in the image and each pixel,
    moving the range finder through the horizontal and vertical angles whereby the range finder is directed at each pixel in sequence, and
    actuating the range finder to obtain a range to the target corresponding to the position of the pixel.

2. A method according to claim 1, wherein the imaging device comprises a camera and the method includes the further steps of
    obtaining a focal length of the camera;
    obtaining a field of view of the camera; and
    obtaining a principal distance of the camera.

3. A method according to claim 1, wherein the method includes the additional steps of
    assigning x and y coordinates for each pixel within the image;
    correlating the range to the target with each pixel within the image; and
    calculating three dimensional coordinates of the pixels to reconstruct a three dimensional image of the target area.

4. A method according to claim 3, wherein the method includes the additional steps of
    plotting each of the three dimensional points of the image; and
    superimposing a wire frame over the image connecting each of the three dimensional points.

5. A method according to claim 4, wherein the method includes the additional step of superimposing the image on the wire frame to reconstruct a three dimensional image of the target area.

6. A method according to claim 1, wherein the imaging device comprises a camera, and the method includes the further steps of
    obtaining a horizontal offset and a vertical offset between an axis of the camera and an axis of the range finder;
    calculating the horizontal and vertical offsets in terms of pixels;
    calculating the difference between the horizontal and vertical offsets in terms of pixels and the x and y coordinates of the target pixel; and
    calculating the horizontal and vertical angles.

7. A method according to claim 1, wherein the imaging device comprises a camera and the method includes the further steps of
    providing the range finder and/or camera on a pan and tilt unit;
    providing angle encoders to measure the angles of pan and tilt of the unit;
    instructing the pan and tilt unit to pan and tilt the range finder and/or camera through the vertical and horizontal angles;
    measuring the horizontal and vertical angles using the encoders;
    verifying that the angles through which the range finder and/or camera are moved is correct;
    obtaining horizontal and/or vertical correction angles by subtracting the measured horizontal and vertical angles from the calculated horizontal and vertical angles;
    adjusting the pan and tilt of the range finder and/or camera if necessary; and
    activating the range finder to obtain the range to the target.

* * * * *